(12) United States Patent
Nishikawa

(10) Patent No.: US 11,808,371 B2
(45) Date of Patent: Nov. 7, 2023

(54) GATE VALVE

(71) Applicant: SMC CORPORATION, Tokyo (JP)

(72) Inventor: Takeshi Nishikawa, Abiko (JP)

(73) Assignee: SMC CORPORATION, Tokyo (JP)

(*) Notice: Subject to any disclaimer, the term of this patent is extended or adjusted under 35 U.S.C. 154(b) by 0 days.

(21) Appl. No.: 17/936,566

(22) Filed: Sep. 29, 2022

(65) Prior Publication Data
US 2023/0116364 A1 Apr. 13, 2023

(30) Foreign Application Priority Data

Oct. 13, 2021 (JP) ................................. 2021-168188

(51) Int. Cl.
*F16K 3/02* (2006.01)
*F16K 3/314* (2006.01)
*F16K 51/02* (2006.01)

(52) U.S. Cl.
CPC ............ *F16K 3/0272* (2013.01); *F16K 3/029* (2013.01); *F16K 3/314* (2013.01); *F16K 51/02* (2013.01)

(58) Field of Classification Search
CPC ........ F16K 3/0272; F16K 3/029; F16K 3/314; F16K 51/02
USPC ......................................... 251/195–204, 327
See application file for complete search history.

(56) References Cited

U.S. PATENT DOCUMENTS

| 2,210,189 | A | * | 8/1940 | Sorensen | ................ | F16K 3/186 |
| | | | | | | 251/167 |
| 2,287,435 | A | * | 6/1942 | Koon | ........................ | F16K 3/14 |
| | | | | | | 251/198 |
| 4,052,036 | A | * | 10/1977 | Schertler | ................. | F16K 51/02 |
| | | | | | | 251/197 |
| 2007/0057220 | A1 | * | 3/2007 | Bosch | ..................... | F16K 3/184 |
| | | | | | | 251/195 |
| 2011/0095218 | A1 | | 4/2011 | Schoch et al. | | |

FOREIGN PATENT DOCUMENTS

JP 2011-94795 A 5/2011

* cited by examiner

*Primary Examiner* — John Bastianelli
(74) *Attorney, Agent, or Firm* — Oblon, McClelland, Maier & Neustadt, L.L.P.

(57) ABSTRACT

A gate valve is disposed between first and second chambers and allows a first opening leading to the first chamber and a second opening leading to the second chamber to be communicated and opens and closes. The gate valve includes a valve shaft, first and second valve plates that are attached to a leading end part of the valve shaft, an operation mechanism that moves these valve plates to an evacuation position at which the first opening and the second opening are communicated, a first closed position at which the first opening is closed by the first valve plate, and a second closed position at which the second opening is closed the second valve plate by operating the valve shaft, a fastening mechanism that attaches these valve plates to the valve shaft, and a support mechanism that fasten both end parts of these valve plates in a longitudinal direction.

14 Claims, 17 Drawing Sheets

GATE VALVE

TECHNICAL FIELD

The present invention relates to a gate valve disposed between chambers in a semiconductor manufacturing device or the like, more specifically to a gate valve that is disposed between a first chamber such as a transfer chamber and a second chamber such as a process chamber that are adjacent to each other and is for allowing a first opening leading to the first chamber and a second opening leading to the second chamber to be communicated with each other and for individually opening and closing the first opening and the second opening.

BACKGROUND ART

In such a gate valve, a pair of valve plates are disposed so that back faces thereof face each other, and seal members attached to the valve plates are brought into contact with seat surfaces around the openings to individually open and close the openings. The valve plates need regular maintenance work, for example, since the seal members gradually deteriorate as a result of use and the deteriorated seal members need to be replaced with new ones. Conventionally, however, the whole gate valve needs to be detached once from the position between the chambers to do maintenance work of the valve plates such as replacement of the seal members. This requires a lot of time and effort.

In view of this, in the gate valve described in Patent Literature 1, a support plate is detachably attached to a leading end part of a valve shaft from a leading end side of the valve shaft, and a pair of valve plates are detachably attached to both surfaces of the support plate from the leading end side of the valve shaft. With this configuration, maintenance work of the valve plates can be easily done without detaching the whole gate valve from a position between chambers, for example, when the valve plates and the support plate is made accessible from the leading end side, for example, by detaching a ceiling wall that closes a leading end side of a valve body in which the valve plates are stored, as described in Patent Literature 1. Meanwhile, it is desirable to keep a weight in the vicinity of the valve plates as small as possible in consideration of cost during manufacturing, cost during operation, and the like.

CITATION LIST

Patent Literature

PTL 1: Japanese Unexamined Patent Application Publication No. 2011-94795

SUMMARY OF INVENTION

Technical Problem

In view of the circumstances, a technical object of the present invention is to provide a gate valve that is good in workability during maintenance of valve plates and can keep various costs low by keeping a weight in the vicinity of the valve plates small.

Solution to Problem

In order to accomplish the object, a gate valve according to the present invention is a gate valve that is disposed between a first chamber and a second chamber that are adjacent to each other and allows a first opening leading to the first chamber and a second opening leading to the second chamber to be communicated with each other or individually opens and closes the first opening and the second opening, the gate valve including: a valve shaft that extends in an axial direction from a base end side toward a leading end side; a first valve plate and a second valve plate that are attached to a leading end part of the valve shaft in the axial direction, are long in a direction orthogonal to the axis, and have inner surfaces that face the valve shaft and external surfaces on which annular seal members are provided and that face a side opposite to the inner surfaces; and an operation mechanism that moves the first and second valve plates to an evacuation position at which the first opening and the second opening are communicated with each other, a first closed position at which the first opening is closed by the external surface of the first valve plate, and a second closed position at which the second opening is closed by the external surface of the second valve plate by operating the valve shaft, wherein the gate valve further includes: a fastening mechanism that detachably attaches the first and second valve plates to the leading end part of the valve shaft by disengageably fastening the first and second valve plates and the valve shaft to each other in a state where the inner surface of the first valve plate and the inner surface of the second valve plate are in contact with the leading end part of the valve shaft and the leading end part of the valve shaft is held between the valve plates; and at least one pair of support mechanisms that disengage ably fasten the valve plates to each other at least at both end parts of the first and second valve plates in a longitudinal direction.

In this case, preferably, the fastening mechanism has; a first clamp piece that is disposed so as to straddle the valve shaft and the first valve plate from a leading end side of the valve shaft in the axial direction, is disengage ably engaged with the first valve plate, and is detachably fixed to the valve shaft, a second clamp piece that is disposed so as to straddle the valve shaft and the second valve plate from the leading end side of the valve shaft in the axial direction, is disengageably engaged with the second valve plate, and is detachably fixed to the valve shaft, and a first fastening member and a second fastening member that detachably fix the first clamp piece and the second clamp piece to the leading end part of the valve shaft, respectively; base-end-side end parts of the first and second valve plates in the axial direction are concave-convex engaged with the leading end part of the valve shaft from the leading end side of the valve shaft; in a state where the first and second clamp pieces are fixed to the valve shaft by the first and second fastening members, leading end parts of the first and second valve plates are pressed toward the inner surfaces thereof, respectively by engagement of the first and second clamp pieces and the first and second valve plates, and the base-end-side end parts of the first and second valve plates are pressed toward the inner surfaces thereof, respectively by the concave-convex engagement of the base-end-side end parts of the valve plates and the leading end part of the valve shaft; and the first and second valve plate are thus fastened to the leading end part of the valve shaft.

Furthermore, preferably, the concave-convex engagement of the base-end-side end parts of the valve plates and the leading end part of the valve shaft is formed by engagement of engaging parts provided in base end parts of the pair of valve plates and a pair of parts to be engaged provided in the leading end part of the valve shaft, the engaging parts are any one of (i) recessed parts and (ii) projecting parts engaged with the recessed parts, and the parts to be engaged are the other one of (i) the recessed parts and (ii) the projecting parts; the first valve plate and the second valve plate have, at central parts of the inner surfaces thereof in the longitudinal direction, a first engagement recessed part and a second engagement recessed part that are opened toward the leading end side in the axial direction; the first clamp piece and the second clamp piece have a first engagement projecting part and a second engagement projecting part to be engaged with the first and second engagement recessed parts; the first clamp piece is fixed to the valve shaft by the first fastening member in a state where the first engagement projecting part is engaged with the first engagement recessed part and the engaging part of the first valve plate and the part to be engaged of the valve shaft are engaged with each other, and thereby the first engagement projecting part causes pressing force in a direction of the inner surface of the first valve plate to act on the first engagement recessed part, and the engaging part causes pressing force in the direction of the inner surface of the first valve plate to act on the part to be engaged, and the first valve plate is thus fastened to the valve shaft; the second clamp piece is fixed to the valve shaft by the second fastening member in a state where the second engagement projecting part is engaged with the second engagement recessed part and the engaging part of the second valve plate and the part to be engaged of the valve shaft are engaged with each other, and thereby the second engagement projecting part causes pressing force in a direction of the inner surface of the second valve plate to act on the second engagement recessed part, and the engaging part causes pressing force in the direction of the inner surface of the second valve plate to act on the part to be engaged, and the second valve plate is thus fastened to the valve shaft.

Furthermore, preferably, the first and second fastening members are a first fastening bolt and a second fastening bolt; the valve shaft has, in a leading end surface thereof in the axial direction, a screw hole with which the fastening bolts are screwed; the first and second clamp pieces have through-holes through which the first and second fastening bolts are inserted; and the first clamp piece is fixed to the valve shaft by inserting the first fastening bolt through the through-hole of the first clamp piece and screwing the first fastening bolt with the screw hole of the valve shaft, and the second clamp piece is fixed to the valve shaft by inserting the second fastening bolt through the through-hole of the second clamp piece and screwing the second fastening bolt with the screw hole of the valve shaft.

Furthermore, preferably, the first clamp piece has the first engagement projecting part on one end side relative to the through-hole and has a first locking claw on the other end side; the first locking claw is locked on the valve shaft toward the first engagement projecting part in a state where the first clamp piece is fixed by the first fastening bolt; the second clamp piece has the second engagement projecting part on one end side relative to the through-hole and has a second locking claw on the other end side; and the second locking claw is locked on the valve shaft toward the second engagement projecting part in a state where the second clamp piece is fixed by the second fastening bolt.

Furthermore, preferably, the first clamp piece is rotatable about an axis of the first fastening bolt between an engagement position at which the first engagement projecting part is engaged with the first engagement recessed part and a disengagement position at which the first engagement projecting part is disengaged from the first engagement recessed part in a state where the first fastening bolt is loosened; the first clamp piece is stored in a gap between the inner surface of the first valve plate and the inner surface of the second valve plate in a case where the first clamp piece is rotated from the engagement position to the disengagement position; the second clamp piece is rotatable about an axis of the second fastening bolt between an engagement position at which the second engagement projecting part is engaged with the second engagement recessed part and a disengagement position at which the second engagement projecting part is disengaged from the second engagement recessed part in a state where the second fastening bolt is loosened; and the second clamp piece is stored in the gap between the inner surface of the first valve plate and the inner surface of the second valve plate in a case where the second clamp piece is rotated from the engagement position to the disengagement position.

Furthermore, preferably, the first and second fastening bolts have a shaft part that extends in the axial direction, a head part that is provided at a leading end part of the shaft part in the axial direction, and a male thread part that is provided on an outer circumferential surface of the shaft part; a female thread part with which the male thread part is screwable is provided on inner surfaces of the through-holes provided in the first and second clamp pieces; the shaft part has, at a part thereof closer to the head part than the male thread part, a small-diameter part having an external diameter smaller than an inner diameter of the female thread part; the small-diameter part is inserted through the through-holes; and an end part of the male thread part on a head part side makes contact with the female thread parts of the first and second clamp pieces when the first and second fastening bolts are loosened.

Furthermore, preferably, the pair of the support mechanisms have: at least one pair of support tables held between the first valve plate and the second valve plate at least at both end parts of the first valve plate and the second valve plate in the longitudinal direction, a third clamp piece that is disposed so as to straddle the first valve plate and the second valve plate from a leading end side of each of the pair of support tables in the axial direction, is disengage ably engaged with the first and second valve plates, and is detachably fixed to the support table, and a third fastening member that detachably fixes the third clamp piece to a leading end part of the support table in the axial direction; base-end-side end parts of the first and second valve plates in the axial direction are concave-convex engaged with the support table from a leading end side of the support table; the third clamp piece is fixed to the support table by the third fastening member in a state where the third clamp piece is engaged with the first and second valve plates and the base-end-side end parts of the pair of valve plates and the support table are concave-convex engaged with each other, and thereby leading end parts and the base-end-side end parts of the first and second valve plates are pressed toward the inner surfaces thereof, and the first and second valve plates and the support table are thus fastened to each other.

Furthermore, preferably, the concave-convex engagement of the base-end-side end parts of the pair of valve plates and the support table is formed by engagement of base-end-side engagement recessed parts provided at base-end-side end parts of the pair of valve plates and a pair of base-end-side engagement projecting parts provided on the support table; the first valve plate and the second valve plate have, at least at both end parts of the inner surfaces thereof in the longitudinal direction, a third engagement recessed part and a fourth engagement recessed part that are opened toward a leading end side in the axial direction; the third clamp piece has a third engagement projecting part and a fourth engagement projecting part to be engaged with the third engagement recessed part and the fourth engagement recessed part; and the third clamp piece is fixed to the support table by the third fastening member in a state where the third engagement projecting part and the fourth engagement projecting part are engaged with the third engagement recessed part and the fourth engagement recessed part and the base-end-side engagement recessed parts of the first and second valve plates and the base-end-side engagement projecting parts of the support table are engaged with each other, and thereby the third engagement projecting part and the fourth engagement projecting part cause pressing force in a direction of the inner surface of the first valve plate to act on the third engagement recessed part and the fourth engagement recessed part, respectively, and the base-end-side engagement recessed parts cause pressing force in the direction of the inner surface of the first valve plate to act on the base-end-side engagement projecting parts, and the first and second valve plates and the support table are thus fastened to each other.

Furthermore, preferably, the third fastening member is a third fastening bolt; the support table has, in a leading end surface thereof in the axial direction, a screw hole with which the third fastening bolt is screwed; the third clamp piece has a through-hole through which the third fastening bolt is inserted; and the third clamp piece is fixed to the support table by inserting the third fastening bolt into the through-hole of the third clamp piece and screwing the third fastening bolt with the screw hole of the support table.

Furthermore, preferably, the third engagement recessed part, the fourth engagement recessed part, and the base-end-side engagement recessed parts extend in a longitudinal direction of the valve plates and outer-side ends thereof are opened toward an outer side in the longitudinal direction; and the support table is configured such that each of the support mechanisms is detachable from the first and second valve plates by loosening the third fastening bolt and sliding the third engagement projecting part and the fourth engagement projecting part along the third engagement recessed part and the fourth engagement recessed part and sliding the base-end-side engagement recessed parts along the base-end-side engagement projecting parts in a state where the third engagement projecting part and the fourth engagement projecting part of the third clamp piece are engaged with the third engagement recessed part and the fourth engagement recessed part of the first and second valve plates and the base-end-side engagement recessed parts and the base-end-side engagement projecting parts are engaged with each other.

Furthermore, preferably, the third clamp piece is rotatable about an axis of the third fastening bolt by loosening the third fastening bolt from a state where the third engagement projecting part is engaged with the third engagement recessed part and the fourth engagement projecting part is engaged with the fourth engagement recessed part; the third clamp piece further has a protruding piece part that protrudes in a radial direction about the third fastening bolt; the protruding piece part has, at a leading end part thereof in a protruding direction, a fifth engagement projecting part that is engageable with the third engagement recessed part and the fourth engagement recessed part; the third engagement projecting part and the fourth engagement projecting part are disposed on both sides in the radial direction with the third fastening bolt interposed therebetween; the fifth engagement projecting part is disposed at a right angle with respect to the third engagement projecting part and the fourth engagement projecting part about the axis of the third fastening bolt; and the third clamp piece is configured to be capable of engaging the fifth engagement projecting part with the third engagement recessed part or the fourth engagement recessed part to lock any one of the first valve plate and the second valve plate and disengaging the other one of the valve plates from the third clamp piece by loosening the third fastening bolt and rotating the third clamp piece about an axis of the third fastening bolt in a state where the third engagement projecting part and the fourth engagement projecting part are engaged with the third engagement recessed part and the fourth engagement recessed part.

Furthermore, preferably, the third fastening bolt has a shaft part that extends in the axial direction, a head part that is provided at a leading end part of the shaft part in the axial direction, and a male thread part that is provided on an outer circumferential surface of the shaft part; a female thread part with which the male thread part is screwable is provided on an inner surface of the through-hole opened in the third clamp piece; the shaft part has, at a part thereof on a side closer to the head part than the male thread part, a small-diameter part having an external diameter smaller than an inner diameter of the female thread part; the small-diameter part is inserted through the through-hole; and an end part of the male thread part on a head part side makes contact with the third clamp piece when the third fastening bolt is loosened.

Furthermore, preferably, the gate valve further includes a valve body in which the first valve plate and the second valve plate are stored, and the valve body has side walls that surround the first and second valve plates about the axis and a ceiling wall that is detachably attached to leading-end-side end parts of the side walls in the axial direction; and the first opening and the second opening are opened in the side walls so as to face each other.

Advantageous Effects of Invention

As described above, according to the present invention, a pair of valve plates are detachably attached to a valve shaft by disengageably fastening the pair of valve plates and the valve shaft to each other in a state where a leading end part of the valve shaft is directly held by the pair of valve plates. It is therefore possible to provide a gate valve that is good in workability during maintenance of the valve plates and can keep various costs low by keeping a weight in the vicinity of the valve plates small.

DESCRIPTION OF EMBODIMENTS

First Embodiment

Figure 1:
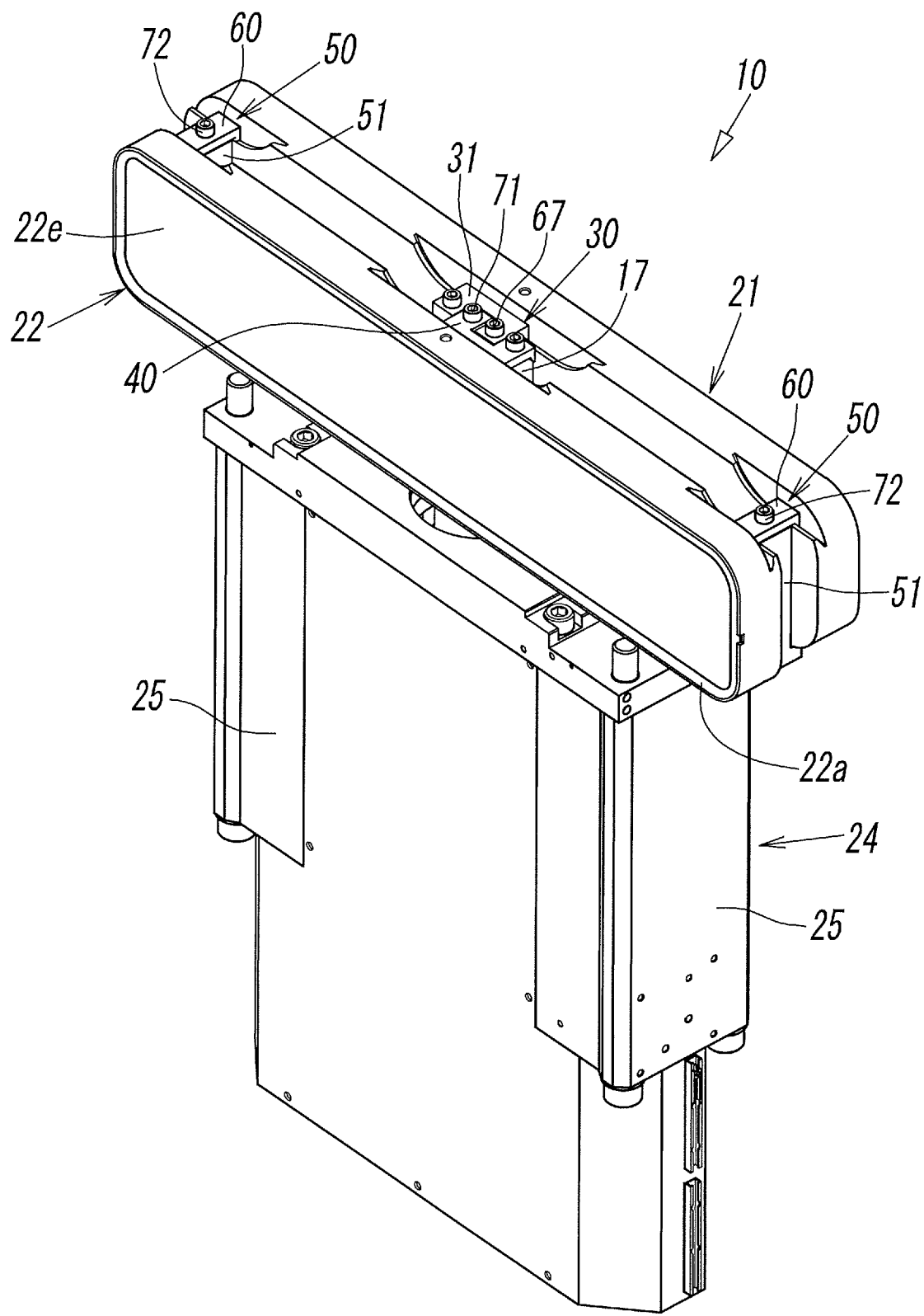
FIG. 1 is a perspective view of a gate valve according to a first embodiment of the present invention.
Figure 2:
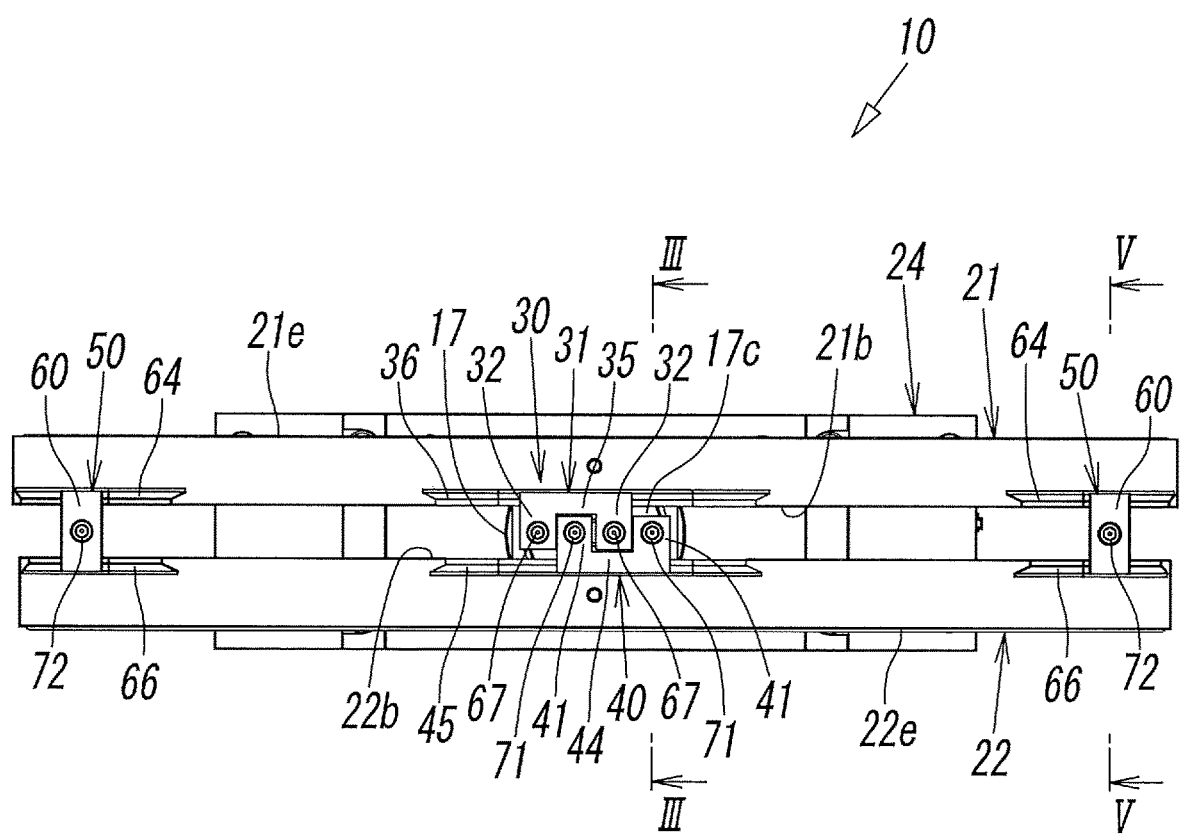
FIG. 2 is a plan view of the gate valve.
Figure 3:
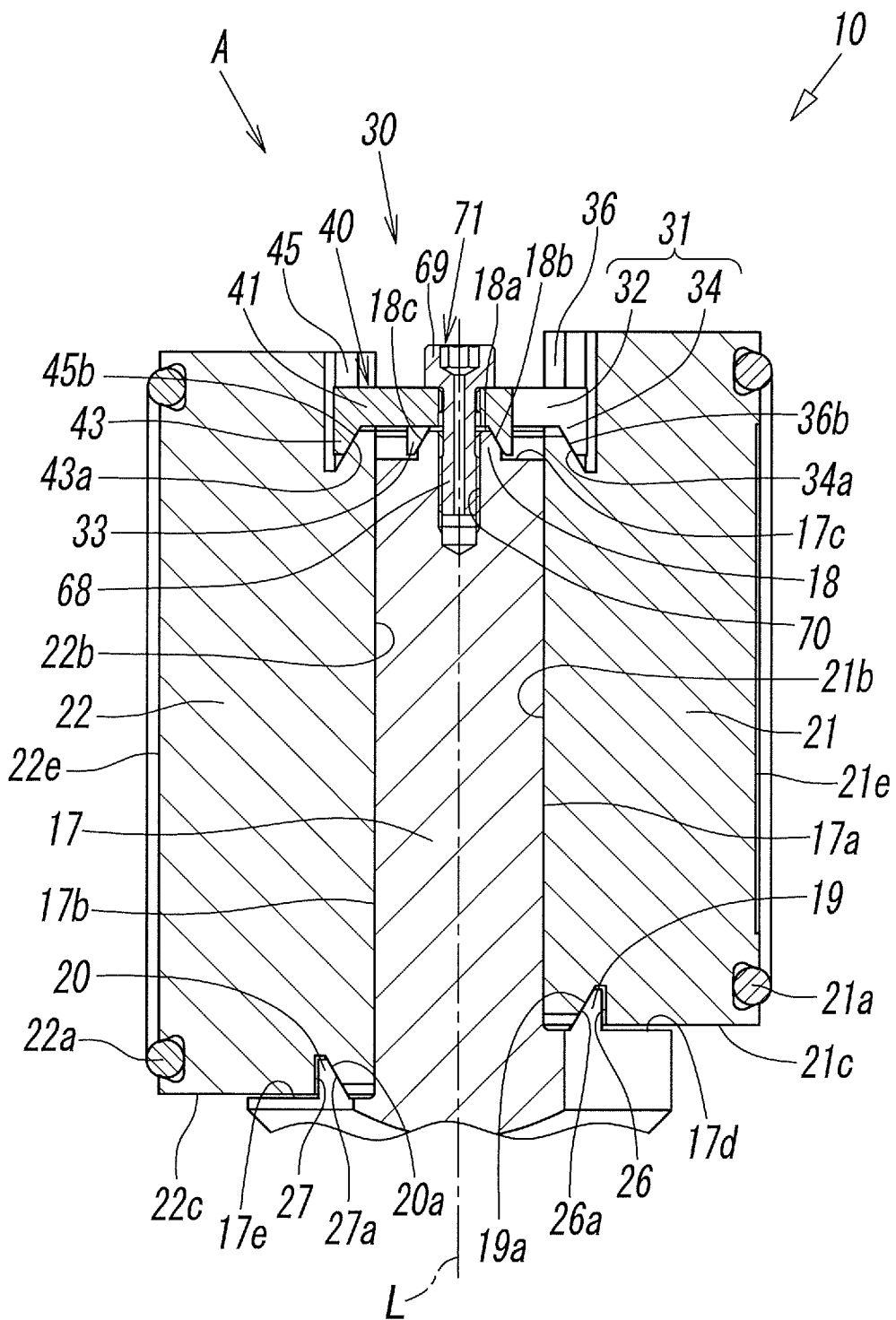
FIG. 3 is a partial cross-sectional view of the gate valve taken along line III-III in FIG. 2.

A gate valve according to the present invention is described below. As illustrated in FIGS. 1, 2, and 3, a gate valve 10 has a valve shaft 17 extending in an up-down direction (a direction of an axis L), a first valve plate 21 and a second valve plate 22 coupled to the valve shaft 17, and an operation mechanism 24 for moving the first valve plate 21 and the second valve plate 22 with use of the valve shaft 17.

The operation mechanism 24 has two air cylinders 25 disposed parallel with each other on left and right sides of the valve shaft 17, and these air cylinders 25 cause the valve shaft 17 to operate and thereby move the first valve plate 21 and the second valve plate 22.

The first valve plate 21 and the second valve plate 22 are disposed so as to face each other with a gap interposed therebetween in a front-rear direction and extend in a left-right direction (longitudinal direction), and the first and second valve plates 21 and 22 have a substantially rectangular plate shape. In the present embodiment, the first valve plate 21 and the second valve plate 22 are elongated in the left-right direction (oblong) in front view. Annular seal members 21a and 22a are provided on outer peripheral parts of seal surfaces (outer surfaces) 21e and 22e on outer surface sides of the first valve plate 21 and the second valve plate 22.

The valve shaft 17 is disposed between the first valve plate 21 and the second valve plate 22, and the first valve plate 21 and the second valve plate 22 are detachably attached to the valve shaft 17 in contact with the valve shaft 17 by a fastening mechanism 30 and are disengageably fastened to each other by a support mechanism 50 at both end parts of the first valve plate 21 and the second valve plate 22 in the longitudinal direction.

The valve shaft 17 extends upward (toward a leading end side in the axial direction) from the operation mechanism 24 so as to extend in the up-down direction (the direction of the axis L), and the valve shaft 17 has, on both sides in the front-rear direction on an upper side thereof, quadrangular first side surface part 17a and second side surface part 17b whose back sides face each other with the axis L interposed therebetween, as illustrated in FIG. 3. In the present embodiment, the first side surface part 17a and the second side surface part 17b extend parallel with each other, an inner surface 21b that faces an opposite direction to the seal surface 21e of the first valve plate 21 is in contact with the first side surface part 17a, an inner surface 22b that faces an opposite direction to the seal surface 22e of the second valve plate 22 is in contact with the second side surface part 17b, and the first valve plate 21 and the second valve plate 22 are provided parallel with each other with the valve shaft 17 interposed therebetween.

Figure 4:
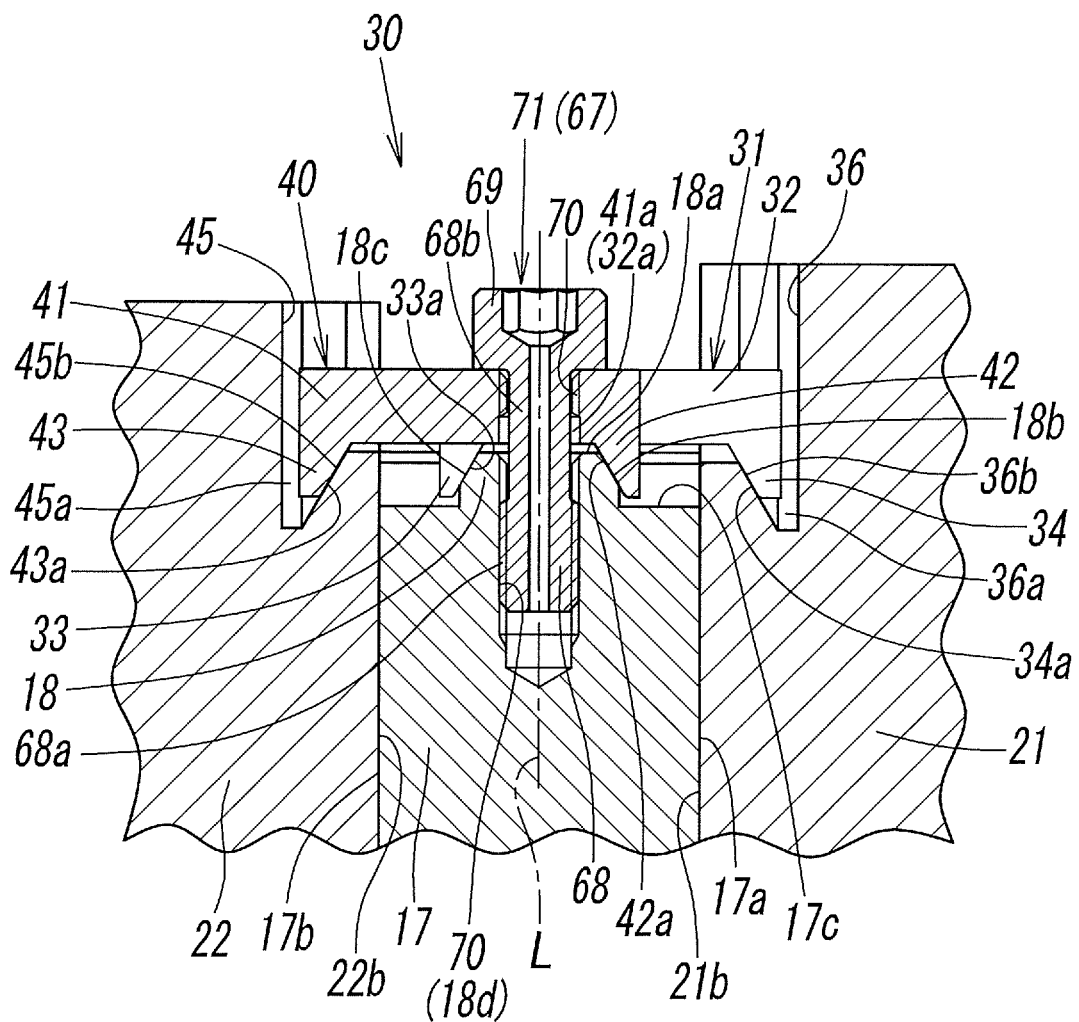
FIG. 4 is an enlarged cross-sectional view of an A portion of FIG. 3.

As illustrated in FIGS. 2, 3, and 4, the fastening mechanism 30 that fastens the first valve plate 21 and the second valve plate 22 to the valve shaft 17 has a first engagement recessed part 36 and a second engagement recessed part 45 that are opened toward the leading end side in the axial direction in central parts, in the longitudinal direction, of the inner surfaces 21b and 22b of the first valve plate 21 and the second valve plate 22, a first clamp piece 31 that is attached from the leading end side of the valve shaft 17 in the axial direction so as to straddle the valve shaft 17 and the first valve plate 21, is disengageably engaged with the first valve plate 21, and is detachably fixed to the valve shaft 17, a second clamp piece 40 that is disposed from the leading end side of the valve shaft 17 in the axial direction so as to straddle the valve shaft 17 and the second valve plate 22, is disengageably engaged with the second valve plate 22, and is detachably fixed to the valve shaft 17, a first fastening bolt 67 (first fastening member) and a second fastening bolt 71 (second fastening member) that fix the first clamp piece 31 and the second clamp piece 40 to an upper end of the valve shaft 17, respectively, lower engagement recessed parts 26 and 27 (engaging parts, recessed parts) provided at base-end-side end parts of the first valve plate 21 and the second valve plate 22, and a first protruding part 19 and a second protruding part 20 (parts to be engaged, projecting parts) that are provided at leading end parts of the valve shaft 17 and with which the lower engagement recessed parts 26 and 27 are engaged from the leading end side of the valve shaft 17. Details of the first engagement recessed part 36 will be described later.

The valve shaft 17 has, at an upper end thereof, a shaft end surface 17c that faces upward. In the present embodiment, the shaft end surface 17c extends in the left-right direction, and a protruding part 18 that extends in the left-right direction and protrudes upward is provided on a middle part of the shaft end surface 17c in the front-rear direction. The protruding part 18 has, at an upper part thereof, a flat surface part 18a that extends in parallel with the shaft end surface 17c, and has, on both sides of the protruding part 18 in the front-rear direction, a first inclined surface 18b and a second inclined surface 18c that are inclined outward toward a lower side. The flat surface part 18a has a plurality of female thread parts 70 (screw holes) provided at intervals in the left-right direction, the first fastening bolt 67 and the second fastening bolt 71 inserted through the first clamp piece 31 and the second clamp piece 40 are screwed into the female thread parts 70, and the first valve plate 21 and the second valve plate 22 are fastened to the valve shaft 17 by the first and second clamp pieces 31 and 40 fixed on the protruding part 18. Details of the first fastening bolt 67 and the female thread parts 70 will be described later.

As illustrated in FIG. 4, the first clamp piece 31 has a first clamp body part 32 that is fixed to the shaft end surface 17c (the protruding part 18) with use of the first fastening bolt 67 (see FIG. 1) and a first engagement projecting part 34 that is provided on a first valve plate 21 side of the first clamp body part 32, protrudes downward, and engages the first valve plate 21. The first clamp body part 32 has a plate shape extending in the front-rear direction and has, on a second valve plate 22 side (on a rear side) thereof, a through-hole 32a through which the first fastening bolt 67 is inserted, and a male thread part 68a of the first fastening bolt 67 inserted through the through-hole 32a is screwed with the female thread part 70 (first fastening member) of the valve shaft 17.

The first clamp body part 32 has, on a second valve plate 22 side, a body locking claw (first locking claw) 33 that protrudes downward. The body locking claw 33 has, on an inner surface thereof, a third inclined surface 33a that extends along the second inclined surface 18c of the protruding part 18. That is, the third inclined surface 33a is inclined rearward (outward) toward a lower side. Accordingly, when the first clamp body part 32 is fastened to the protruding part 18 by the first fastening bolt 67 in a state where the third inclined surface 33a is in contact with the second inclined surface 18c, the third inclined surface 33a is brought into close contact with the second inclined surface 18c by component force (pressing force) of force acting on the second inclined surface 18c from the third inclined surface 33a, and thereby the first clamp piece 31 is fastened to the valve shaft 17.

The first engagement projecting part 34 provided on the first valve plate 21 side of the first clamp body part 32 has, on an inner side thereof, a fourth inclined surface 34a inclined outward toward a lower side. In the present embodiment, the first clamp piece 31 has two first clamp body parts 32 disposed apart from each other in the left-right direction and a coupling part 35 that couples front sides of these two first clamp body parts 32, as illustrated in FIG. 2. On lower parts of the two first clamp body parts 32 and the coupling part 35 on the first valve plate 21 side, the first engagement projecting part 34 (see FIG. 4) extends from one end to the other end of the first clamp piece 31 in the left-right direction. A second clamp body part 41 of the second clamp piece 40, which will be described later, is disposed between the two first clamp body parts 32.

As illustrated in FIGS. 2 and 4, the first valve plate 21 has, on an inner surface thereof with which the first clamp piece 31 makes contact, the first engagement recessed part 36 that is recessed toward the front side and engages the first engagement projecting part 34. The first engagement recessed part 36 has, in a bottom part thereof, a first engagement groove 36a that is recessed downward from a position on the front side relative to the inner surface 21b. In the present embodiment, the first engagement recessed part 36 is provided in an upper part of the inner surface 21b of the first valve plate 21 that is located in a middle part in the left-right direction. The first engagement recessed part 36 is opened on an inner side, and extends upward so as to be opened on an upper end of the first valve plate 21. The first engagement groove 36a of the first engagement recessed part 36 has a fifth inclined surface 36b that is inclined upward toward the valve shaft 17.

With this configuration, when the first clamp piece 31 is fastened to an upper end part of the valve shaft 17 with the use of the first fastening bolt 67 and the fourth inclined surface 34a of the first clamp piece 31 is pressed against the fifth inclined surface 36b of the first engagement recessed part 36, an upper part of the first valve plate 21 can be fastened in close contact with the valve shaft 17 (the first side surface part 17a) by inward component force of force acting on the fourth inclined surface 34a.

Furthermore, a lower end part (base-end-side end part) of the first valve plate 21 is concave-convex engaged with the leading end part of the valve shaft 17 from the leading end side of the valve shaft 17. Specifically, the first valve plate 21 has, on an inner side of a bottom surface 21c, the lower engagement recessed part (recessed part) 26 that is located in a middle part in the left-right direction and below the first engagement recessed part 36, is recessed upward, and extends in the left-right direction, as illustrated in FIG. 3. The lower engagement recessed part 26 has, on an inner side thereof, a sixth inclined surface 26a that is inclined outward toward the upper side, and the first protruding part 19 (a part to be engaged, a projecting part) of the valve shaft 17 is inserted into the lower engagement recessed part 26. The first protruding part 19 is provided on a front-side step part 17d that extends toward the front side from a lower end of the first side surface part 17a of the valve shaft 17. The first protruding part 19 extends in the left-right direction on the front-side step part 17d, and the first protruding part 19 has, on an inner side thereof, a seventh inclined surface 19a that is inclined outward toward the upper side.

With this configuration, when the first clamp piece 31 is fixed to an upper end of the valve shaft 17 by the first fastening bolt 67, the first valve plate 21 is pressed downward by component force of force by which the fourth inclined surface 34a of the first clamp piece 31 is pressed against the fifth inclined surface 36b of the first valve plate 21. Accordingly, the sixth inclined surface 26a provided on a lower part of the first valve plate 21 is pressed against the seventh inclined surface 19a of the valve shaft 17, and a lower side of the first valve plate 21 is fastened in close contact with the valve shaft 17 (the first side surface part 17a) by component force of reaction force from the seventh inclined surface 19a.

Accordingly, by fixing the first clamp piece 31 to the upper end of the valve shaft 17, the first valve plate 21 can be attached in close contact with the first side surface part 17a of the valve shaft 17.

As illustrated in FIG. 4, the second clamp piece 40 is similar to the first clamp piece 31 and has the second clamp body part 41 that is fixed to the protruding part 18 provided on the shaft end surface 17c with the use of the second fastening bolt 71 and a second engagement projecting part 43 that protrudes downward from a second valve plate 22 side of the second clamp body part 41 and engages the second valve plate 22. The second clamp body part 41 has a plate shape extending in the front-rear direction, and the second clamp body part 41 has, at an end part thereof on a first valve plate 21 side, a through-hole 41a through which the second fastening bolt 71 is inserted. The second fastening bolt 71 inserted through the through-hole 41a is screwed with the female thread part 70 of the valve shaft 17. Note that in the present embodiment, the first fastening bolt 67 and the second fastening bolt 71 are hexagon socket head cap screws.

The second clamp body part 41 has, at an end part thereof on the first valve plate 21 side (on the front side), a body locking claw 42 that protrudes downward. The body locking claw 42 has, on an inner surface thereof, an eighth inclined surface 42a that extends along the first inclined surface 18b of the protruding part 18 provided at the upper end of the valve shaft 17. That is, the eighth inclined surface 42a is inclined frontward (outward) toward the lower side. With this configuration, when the second clamp body part 41 is fixed to the protruding part 18 by the second fastening bolt 71 in a state where the eighth inclined surface 42a is in contact with the first inclined surface 18b, the eighth inclined surface 42a is brought into close contact with the first inclined surface 18b by component force of force that acts on the first inclined surface 18b from the eighth inclined surface 42a, and thereby the second clamp piece 40 is fastened to the valve shaft 17.

The second engagement projecting part 43 has, on an inner side thereof, a ninth inclined surface 43a that is inclined outward (rearward) toward the lower side. In the present embodiment, the second clamp piece 40 has two second clamp body parts 41 disposed apart from each other in the left-right direction and a coupling part 44 that connects second valve plate 22 sides (rear sides) of these two second clamp body parts 41, as illustrated in FIG. 2. On lower parts of the two second clamp body parts 41 and the coupling part 44 on the second valve plate 22 side, the second engagement projecting part 43 (see FIG. 4) extends from one end to the other end of the second clamp piece 40 in the left-right direction. The first clamp body part 32 of the first clamp piece 31 is disposed between the two second clamp body parts 41.

As illustrated in FIGS. 2 and 4, the second valve plate 22 has, in the inner surface 22b thereof with which the second clamp piece 40 makes contact, has the second engagement recessed part 45 that is recessed toward the rear side and engages the second engagement projecting part 43. The second engagement recessed part 45 has, at a bottom part thereof, a second engagement groove 45a that is recessed downward from a position on a rear side relative to the inner surface 22b. In the present embodiment, the second engagement recessed part 45 is provided in an upper part of the inner surface 22b of the second valve plate 22 and is located in a middle part in the left-right direction. The second engagement recessed part 45 is opened on an inner side, and extends upward so as to be opened on an upper end of the second valve plate 22. The second engagement groove 45a of the second engagement recessed part 45 has a tenth inclined surface 45b that is inclined upward toward the valve shaft 17.

With this configuration, when the second clamp piece 40 is fixed to the upper end (the protruding part 18) of the valve shaft 17 by the second fastening bolt 71 and the ninth inclined surface 43a of the second clamp piece 40 is pressed against the tenth inclined surface 45b of the second engagement recessed part 45, an upper part of the second valve plate 22 can be fastened in close contact with the valve shaft 17 (the second side surface part 17b) by inward component force of force that acts on the tenth inclined surface 45b.

Furthermore, a lower end part (base-end-side end part) of the second valve plate 22 is concave-convex engaged with the leading end part of the valve shaft 17 from the leading end side of the valve shaft 17. Specifically, as illustrated in FIG. 3, the second valve plate 22 has, on an inner side of a bottom surface 22c, a lower engagement recessed part 27 that is located below the second engagement recessed part 45 and is recessed upward. The lower engagement recessed part 27 has, on an inner side thereof, an eleventh inclined surface 27a that is inclined outward toward the upper side. Into the lower engagement recessed part 27, the second protruding part 20 (a part to be engaged, a projecting part) provided on the valve shaft 17 is inserted. The second protruding part 20 is provided on a rear-side step part 17e that extends toward the rear side from a lower end of the second side surface part 17b of the valve shaft 17. The second protruding part 20 extends in the left-right direction on the rear-side step part 17e, and the second protruding part 20 has, on an inner side thereof, a twelfth inclined surface 20a that is inclined outward toward the upper side.

With this configuration, when the second clamp piece 40 is fixed to the upper end of the valve shaft 17 by the second fastening bolt 71, the second valve plate 22 is pressed downward by component force of force by which the ninth inclined surface 43a of the second clamp piece 40 is pressed against the tenth inclined surface 45b of the second valve plate 22. Accordingly, the eleventh inclined surface 27a provided on a lower part of the second valve plate 22 is pressed against the twelfth inclined surface 20a of the valve shaft 17, and the lower side of the second valve plate 22 can be fastened in close contact with the valve shaft 17 (the second side surface part 17b) by component force of reaction force from the twelfth inclined surface 20a.

Accordingly, by fixing the second clamp piece 40 to the upper end of the valve shaft 17, the second valve plate 22 can be attached in close contact with the valve shaft 17.

The first and second fastening bolts 67 and 71 and the female thread parts 70 are described below. Note that the following describes the second fastening bolt 71 since the first and second fastening bolts 67 and 71 are identical. As illustrated in FIG. 4, the second fastening bolt 71 has a shaft part 68 extending along the direction of the axis L, a head part 69 provided at an upper end of the shaft part 68, and a male thread part 68a provided on an outer circumference on a lower side of the shaft part 68. The shaft part 68 has, above the male thread part 68a, a small-diameter part (unthreaded part) 68b where the male thread part 68a is not provided. The small-diameter part 68b has a smaller diameter than an external diameter of the male thread part 68a and has a smaller diameter than the female thread part 70 provided on an inner surface of the through-hole 41a of the second clamp piece 40. That is, the female thread part 70 is provided on an inner surface of a hole part 18d extending downward from the flat surface part 18a of the protruding part 18 and on an upper part of an inner surface of the through-hole 41a provided in the second clamp body part 41. Note that the female thread part 70 is also provided in the first clamp body part 32, as in the second clamp body part 41.

When the male thread part 68a is screwed into the female thread part 70 by rotating the second fastening bolt 71 in one direction about the axis, the second clamp piece 40 can be fixed to an upper end part of the valve shaft 17 in a state where the head part 69 of the second fastening bolt 71 is pressed against an upper surface of the second clamp piece 40.

Meanwhile, in a case where the second clamp piece 40 is unfastened from the valve shaft 17, the second fastening bolt 71 is rotated in the other direction about the axis, and the shaft part 68 is moved upward along the female thread part 70. In this process, when the small-diameter part 68b moves in the female thread part 70 of the second clamp piece 40, an upper end of the male thread part 68a makes contact with a lower end of the female thread part 70 of the second clamp piece 40 and presses the second clamp piece 40 upward. Accordingly, as a result of upward movement of the second fastening bolt 71, the second engagement projecting part 43 of the second clamp piece 40 is disengaged from the second engagement groove 45a of the second engagement recessed part 45, and engagement of the second clamp piece 40 with the second valve plate 22 is released.

A length of the male thread part 68a in the axial direction needs to be larger than a distance in the axial direction over which the second engagement projecting part 43 needs to move to come off from the second engagement groove 45a. Since the male thread part 68a is screwed with the female thread part 70 on the valve shaft 17 side when engagement of the second clamp piece 40 with the second valve plate 22 is released, it is possible to prevent the second fastening bolt 71 from being detached from the valve shaft 17 and falling or being lost.

Figure 5:
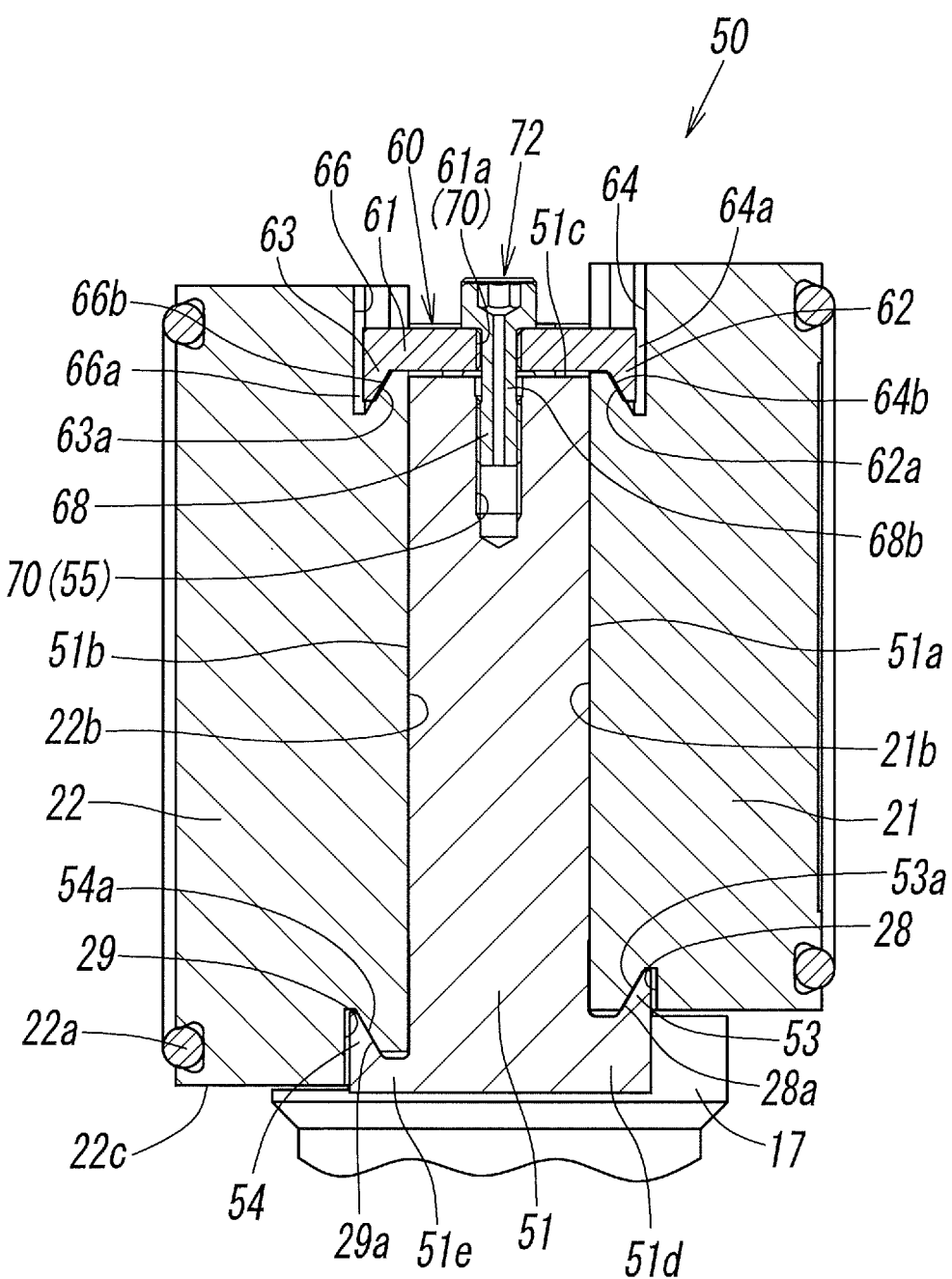
FIG. 5 is a cross-sectional view of the gate valve taken along line V-V in FIG. 2.

Furthermore, since the third fastening bolt 72 and the female thread part 70 provided in the support mechanism 50 illustrated in FIG. 5 are similar to the first and second fastening bolts 67 and 71 and the female thread parts 70 provided in the fastening mechanism 30, the third fastening bolt 72 and the female thread part 70 of the support mechanism 50 are given identical reference signs, and description thereof is omitted.

Figure 6:
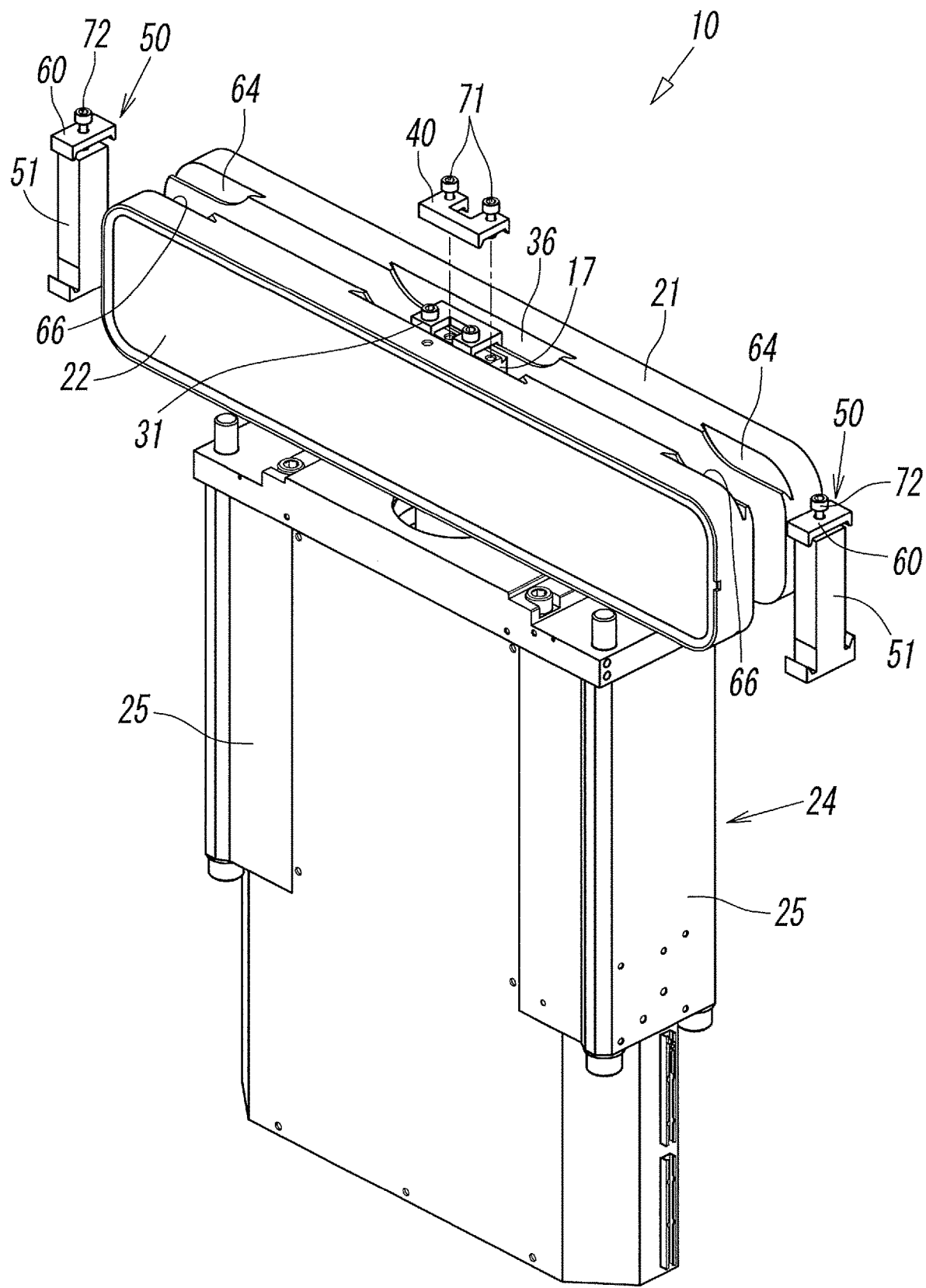
FIG. 6 is a perspective view of the gate valve in a case where a second valve plate is replaced.

Next, the support mechanism 50 is described. As illustrated in FIGS. 5 and 6, the support mechanism 50 has a third engagement recessed part 64 and a fourth engagement recessed part 66 that are provided in the inner surfaces 21b and 22b of the first valve plate 21 and the second valve plate 22, respectively, a support table 51 disposed between both sides of the first valve plate 21 and the second valve plate 22 in the left-right direction, a third clamp piece 60 that is disposed on an upper end of the support table 51 and is engaged with the third engagement recessed part 64 and the fourth engagement recessed part 66, the third fastening bolt 72 (third fastening member) that detachably fixes the third clamp piece 60 to the support table 51, lower engagement recessed parts (base-end-side engaging parts, recessed parts) 28 and 29 provided at base-end-side end parts on both end sides in the longitudinal direction of the first valve plate 21 and the second valve plate 22, and a third protruding part 53 and a fourth protruding part (base-end-side engagement projecting parts, projecting parts) 54 that are provided on the support table 51 and engages the lower engagement recessed parts 28 and 29 from the leading-end side of the support table 51.

The support table 51 has, at an upper end part thereof, a support end surface 51c that faces upward and is flat, and has a rectangular parallelepiped shape extending in the up-down direction. The support table 51 has, on both sides thereof in the front-rear direction, a first contact surface part 51a and a second contact surface part 51b that make contact with the inner surfaces 21b and 22b of the first valve plate 21 and the second valve plate 22, respectively. A hole part 55 that extends downward is provided at a central part of the support end surface 51c, and the female thread part 70 (screw hole) is provided on an inner surface of the hole part 55. The third fastening bolt 72 for fixing the third clamp piece 60 to the support table 51 is screwed with the female thread part 70.

Lower end parts (base-end-side end parts) of the first and second valve plates 21 and 22 are concave-convex engaged with the support table 51 from the leading end side of the support table 51. Specifically, as illustrated in FIG. 5, the support table 51 has, on a lower part of the first contact surface part 51a thereof, a front-side step part 51d that protrudes forward and extends in the left-right direction, and the front-side step part 51d has, at a leading end part (front end part) thereof, a third protruding part 53 that protrudes upward and extends in the left-right direction. The third protruding part 53 has, on an inner surface thereof, a thirteenth inclined surface 53a that is inclined outward (frontward) toward the upper side. The third protruding part 53 is inserted into the lower engagement recessed part 28 provided in a bottom surface of the first valve plate 21, and a lower end part of the first valve plate 21 is concave-convex engaged with the support table 51 from the leading end side of the support table 51.

The lower engagement recessed part 28 is provided on both sides, in the left-right direction, of the bottom surface 21c of the first valve plate 21 and extends in the left-right direction, and an outer end part of the lower engagement recessed part 28 in the left-right direction is opened at an end of the first valve plate 21 in the left-right direction. That is, the lower engagement recessed part 28 is opened downward, and is opened at an end part of the first valve plate 21 in the left-right direction. The lower engagement recessed part 28 has, on an inner side thereof, a fourteenth inclined surface 28a that is inclined outward (frontward) toward the upper side.

Meanwhile, the support table 51 has, on a lower part of the second contact surface part 51b, a rear-side step part 51e that protrudes toward the second valve plate 22 and extends in the left-right direction. The rear-side step part 51e has, at an outer end part thereof, a fourth protruding part 54 that protrudes upward, and the fourth protruding part 54 has, on an inner surface thereof, a fifteenth inclined surface 54a that is inclined outward (rearward) toward the upper side. The fourth protruding part 54 is inserted into the lower engagement recessed part 29 provided in the bottom surface 22c of the second valve plate 22, and a lower end part of the second valve plate 22 is concave-convex engaged with the support table 51 from the leading end side of the support table 51.

The lower engagement recessed part 29 is provided on both sides, in the left-right direction, of the bottom surface 22c of the second valve plate 22 and extends in the left-right direction, and an outer end part of the lower engagement recessed part 29 in the left-right direction is opened at an end part of the second valve plate 22 in the left-right direction. That is, the lower engagement recessed part 29 is opened downward, and is opened at an end part of the second valve plate 22 in the left-right direction. The lower engagement recessed part 29 has, on an inner side thereof, a sixteenth inclined surface 29a that is inclined outward (rearward) toward the upper side.

Next, the third clamp piece 60 is described. As illustrated in FIG. 5, the third clamp piece 60 has a third clamp body part 61 that is fixed to the support end surface 51c of the support table 51 by the third fastening bolt 72 and extends in the front-rear direction while the third fastening bolt 72 is located at a center thereof, and a third engagement projecting part 62 and a fourth engagement projecting part 63 that are provided at both end parts of the third clamp body part 61 in the front-rear direction, protrude toward the first valve plate 21 and the second valve plate 22, and are engaged with the first valve plate 21 and the second valve plate 22, respectively.

The third clamp body part 61 has a plate shape extending in the front-rear direction, and both sides of the third clamp body part 61 in the front-rear direction extend beyond the first contact surface part 51a and the second contact surface part 51b of the support table 51, respectively. The third clamp body part 61 has, at a center thereof in the front-rear direction, a through-hole 61a extending in the up-down direction, and the female thread part (screw hole) 70 is provided on an inner surface of the through-hole 61a. Furthermore, the support table 51 has, in the support end surface 51c, a hole part 55 extending downward, and the female thread part (screw hole) 70 is provided on an inner surface of the hole part 55. That is, the female thread part 70 is provided on the inner surface of the through-hole 61a and the inner surface of the hole part 55. Note that in the present embodiment, the female thread part 70 provided on the inner surface of the through-hole 61a is provided from a lower part to an upper part of the inner surface of the through-hole 61a.

The third engagement projecting part 62 protrudes downward from a front-side end part of the third clamp body part 61 and has, on an inner side thereof, a seventeenth inclined surface 62a that is inclined outward toward the lower side. The first valve plate 21 has, on the inner surface 21b with which the third engagement projecting part 62 makes contact, the third engagement recessed part 64 that is recessed toward the front side and engages the third engagement projecting part 62.

The third engagement recessed part 64 has, in a bottom part thereof, a third engagement groove 64a that is recessed downward, and the third engagement groove 64a has an eighteenth inclined surface 64b that is inclined upward toward the valve shaft 17. In the present embodiment, the third engagement recessed part 64 extends in the left-right direction on both sides of the first valve plate 21 in the left-right direction and is opened at both ends in the left-right direction, and is opened at an upper end (see FIG. 6).

As illustrated in FIG. 5, when the third clamp piece 60 configured as above is fixed to the upper end part of the support table 51 by the third fastening bolt 72, the seventeenth inclined surface 62a of the third engagement projecting part 62 is pressed against the eighteenth inclined surface 64b of the third engagement recessed part 64, and an upper part of the first valve plate 21 is fastened in close contact with the support table 51 by component force of force acting on the eighteenth inclined surface 64b.

Furthermore, when the third clamp piece 60 is fixed to the upper end part of the support table 51 by the third fastening bolt 72, the first valve plate 21 is pressed downward by the third clamp piece 60. Accordingly, the fourteenth inclined surface 28a provided in a lower part of the first valve plate 21 is pressed against the thirteenth inclined surface 53a of the valve shaft 17, and a lower side (base-end-side end part) of the first valve plate 21 is fastened in close contact with the support table 51 by component force of reaction force from the thirteenth inclined surface 53a.

Meanwhile, the fourth engagement projecting part 63 of the third clamp piece 60 protrudes downward from a rear-side end part of the third clamp body part 61 and has, on an inner side thereof, a nineteenth inclined surface 63a that is inclined outward toward the lower side. The second valve plate 22 has, on an inner surface thereof with which the fourth engagement projecting part 63 makes contact, has the fourth engagement recessed part 66 that is recessed toward the rear side and engages the fourth engagement projecting part 63.

The fourth engagement recessed part 66 has, in a bottom part thereof, a fourth engagement groove 66a that is recessed downward. The fourth engagement groove 66a has a twenty-first inclined surface 66b that is inclined upward toward the valve shaft 17. In the present embodiment, the fourth engagement recessed part 66 extends in the left-right direction on both sides of the second valve plate 21 in the left-right direction, and is opened at both ends in the left-right direction and is opened at an upper end.

Accordingly, as illustrated in FIG. 5, when the third clamp piece 60 is fixed to the upper end part of the support table 51 by the third fastening bolt 72, and the nineteenth inclined surface 63a of the fourth engagement projecting part 63 is pressed against the twenty-first inclined surface 66b of the fourth engagement recessed part 66, the upper part of the second valve plate 22 can be fastened in close contact with the support table 51 by component force of force acting on the twenty-first inclined surface 66b.

Furthermore, when the third clamp piece 60 is fixed to the upper end part of the support table 51 by the third fastening bolt 72, the second valve plate 22 is pressed downward by the third clamp piece 60. Accordingly, the sixteenth inclined surface 29a provided in the lower part of the second valve plate 22 is pressed against the fifteenth inclined surface 54a of the support table 51, and the lower side of the second valve plate 22 is fastened in close contact with the support table 51 by component force of reaction force from the fifteenth inclined surface 54a. Accordingly, by fixing the third clamp piece 60 to the upper end part of the support table 51 by the third fastening bolt 72, the first valve plate 21 and the second valve plate 22 can be fastened to each other with the support table 51 interposed therebetween.

The third engagement recessed part 64 and the fourth engagement recessed part 66 provided in the upper parts of the first valve plate 21 and the second valve plate 22 and the lower engagement recessed parts 28 and 29 provided in the lower parts of the first valve plate 21 and the second valve plate 22 extend toward an outer side in the left-right direction and are opened at outer ends in the left-right direction, as described above. When the third fastening bolt 72 is loosened in a state where the third clamp piece 60 is engaged with the third engagement recessed part 64 and the fourth engagement recessed part 66 and the third protruding part 53 and the fourth protruding part 54 are engaged with the lower engagement recessed parts 28 and 29, pressing of the third clamp piece 60 against the first valve plate 21 and the second valve plate 22 is lessened. Accordingly, when the support table 51 is pressed toward an outer side in the left-right direction with respect to the first valve plate 21 and the second valve plate 22, the third engagement projecting part 62 and the fourth engagement projecting part 63 slide along the third engagement recessed part 64 and the fourth engagement recessed part 66, and the third protruding part 53 and the fourth protruding part 54 slide along the lower engagement recessed parts 28 and 29, and thereby the support mechanism 50 can be detached from the first and second valve plates 21 and 22.

Next, a case where either one of the first valve plate 21 and the second valve plate 22 attached to the valve shaft 17 is detached is described. In the present embodiment, a case where the second valve plate 22 is detached is described. As illustrated in FIG. 6, first, pressing of the third clamp piece 60 against the first valve plate 21 and the second valve plate 22 is lessened by rotating the third fastening bolt 72 that fixes the third clamp piece 60 in either one of the two support tables 51 attached to the first valve plate 21 and the second valve plate 22. Accordingly, pressing of the third engagement projecting part 62 and the fourth engagement projecting part 63 of the third clamp piece 60 against the third engagement recessed part 64 and the fourth engagement recessed part 66 is lessened, and the support table 51 becomes slidable with respect to the first valve plate 21 and the second valve plate 22. Furthermore, the other support table 51 also becomes slidable, similarly to the one support table 51.

Then, the one support table 51 is detached by sliding the one support table 51 toward an outer side in the left-right direction with respect to the first valve plate 21 and the second valve plate 22 together with the third clamp piece 60. Similarly, the other support table 51 is detached by sliding the other support table 51 toward an outer side in the left-right direction with respect to the first valve plate 21 and the second valve plate 22.

Figure 7:
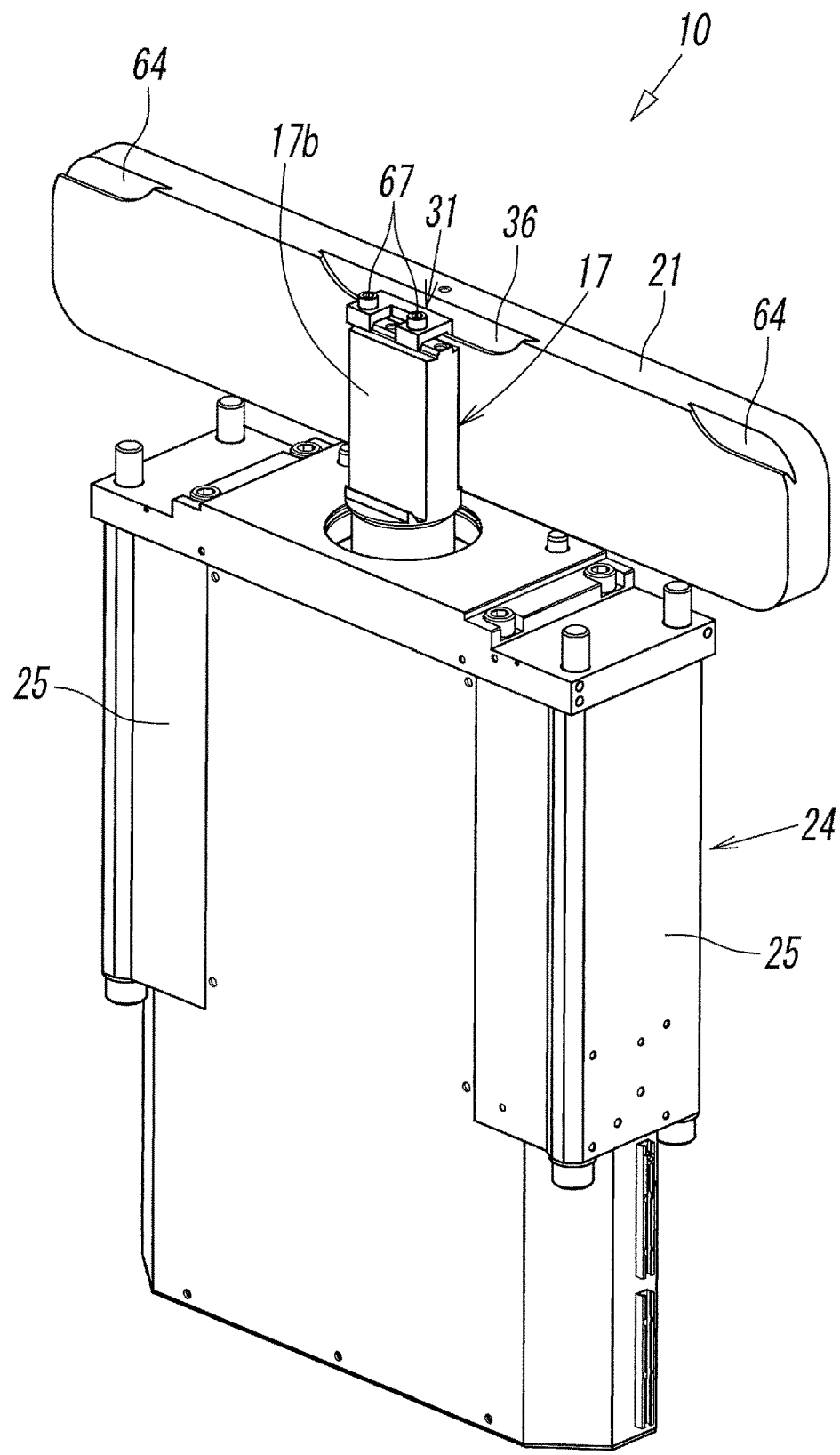
FIG. 7 is a perspective view of the gate valve in a state where the second valve plate has been detached from a valve shaft.

Then, the second fastening bolt 71 is unscrewed from the female thread part 70 provided in the valve shaft 17 by rotating the second fastening bolt 71 inserted through the second clamp piece 40, and thereby the second clamp piece 40 is detached from the valve shaft 17. Then, when the second valve plate 22 is lifted upward, the second protruding part 20 (see FIG. 3) of the valve shaft 17 is disengaged from the lower engagement recessed part 27 (see FIG. 3) provided in the bottom surface of the second valve plate 22, and the fourth protruding part 54 (see FIG. 5) of the valve shaft 17 is disengaged from the lower engagement recessed part 29 (see FIG. 5), and thereby the second valve plate 22 is detached from the valve shaft 17. This brings the gate valve 10 to a state where the second valve plate 22 has been detached and only the first valve plate 21 is attached, as illustrated in FIG. 7.

Next, a case where the second valve plate 22 is attached to the valve shaft 17 is described. First, as illustrated in FIGS. 3 and 5, the second protruding part 20 of the valve shaft 17 is inserted into the lower engagement recessed part 27 of the second valve plate 22, and the fourth protruding part 54 is inserted into the lower engagement recessed part 29. Then, the second valve plate 22 is tilted toward the valve shaft 17 to bring the inner surface 22b of the second valve plate 22 into contact with the second side surface part 17b of the valve shaft 17. Then, the second clamp piece 40 is fixed to the upper end part of the valve shaft 17 by the second fastening bolt 71 in a state where the second engagement projecting part 43 of the second clamp piece 40 is inserted into the second engagement recessed part 45. As a result, the second valve plate 22 is fastened in close contact with the valve shaft 17.

Then, the third protruding part 53 and the fourth protruding part 54 of the support table 51 are inserted into the lower engagement recessed parts 28 and 29 provided in the lower parts of the first valve plate 21 and the second valve plate 22 and the third engagement projecting part 62 and the fourth engagement projecting part 63 of the third clamp piece 60 are inserted into the third engagement recessed part 64 and the fourth engagement recessed part 66 of the first valve plate 21 and the second valve plate 22 by moving the two support tables 51 toward the valve shaft 17 from outer end parts, in the left-right direction, of the first valve plate 21 and the second valve plate 22 as illustrated in FIGS. 5 and 6 in a state where the third fastening bolt 72 inserted through the third clamp piece 60 attached to the upper end of each support table 51 is loosened.

Then, the one support table 51 is moved to a predetermined position with respect to the first valve plate 21 and the second valve plate 22 by sliding the one support table 51 toward the valve shaft 17. Then, one side of the first valve plate 21 in the left-right direction and one side of the second valve plate 22 in the left-right direction are fastened to each other with the support table interposed therebetween by tightly fastening the third fastening bolt 72 to the third clamp piece 60. Similarly to the one support table 51, the other side of the first valve plate 21 in the left-right direction and the other side of the second valve plate 22 in the left-right direction are fastened to each other with the other support table 51 interposed therebetween. In this way, the second valve plate 22 is attached to the valve shaft 17.

As described above, according to the gate valve 10 according to the present embodiment, the pair of valve plates 21 and 22 are detachably attached to the valve shaft 17 by disengageably fastening the pair of valve plates 21 and 22 and the valve shaft 17 to each other in a state where the leading end part of the valve shaft 17 is directly held between the first valve plate 21 and the second valve plate 22. It is therefore possible to provide the gate valve 10 that is good in workability during maintenance of the valve plates 21 and 22 and can keep various costs low by keeping a weight in the vicinity of the valve plates 21 and 22 small.

Furthermore, according to the gate valve 10 according to the present embodiment, the first valve plate 21 and the second valve plate 22 can be attached to and detached from the valve shaft 17 by tightening and loosening fastening of the first and second fastening bolts 67 and 71 inserted into the first clamp piece 31 and the second clamp piece 40. Furthermore, according to the gate valve 10 according to the present embodiment, the support table 51 can be detached from the first valve plate 21 and the second valve plate 22 and the first valve plate 21 and the second valve plate 22 can be coupled to each other just by tightening and loosening fastening of the third fastening bolt 72 without detaching the third clamp piece 60 and the third fastening bolt 72 from the support table 51. Therefore, according to the gate valve 10 according to the present embodiment, work of fixing or detaching the first valve plate 21 and the second valve plate 22 to or from the valve shaft 17 can be easily done, and workability during maintenance of the valve plates 21 and 22 can be improved.

Furthermore, the first, second, and third fastening bolts 67, 71, and 72 that fasten the first clamp piece 31, the second clamp piece 40, and the third clamp piece 60 can be prevented from coming off from the clamp pieces 31, 40, and 60 and are configured to move the clamp pieces 31, 40, and 60 upward together with the fastening bolts 67, 71, and 72 when the fastening bolts 67, 71, and 72 are rotated to loosen the fastening. This makes it possible to prevent the fastening bolts 67, 71, and 72 from falling or being lost when locking of the clamp pieces 31, 40, and 60 is released, thereby making it possible to more easily do work of replacing the first valve plate 21 and the second valve plate 22.

Second Embodiment

Next, a second embodiment of a gate valve 10 according to the present invention is described. In the second embodiment, differences from the first embodiment are mainly described, and parts identical to those in the first embodiment are given identical reference signs, and description thereof is omitted.

Figure 8:
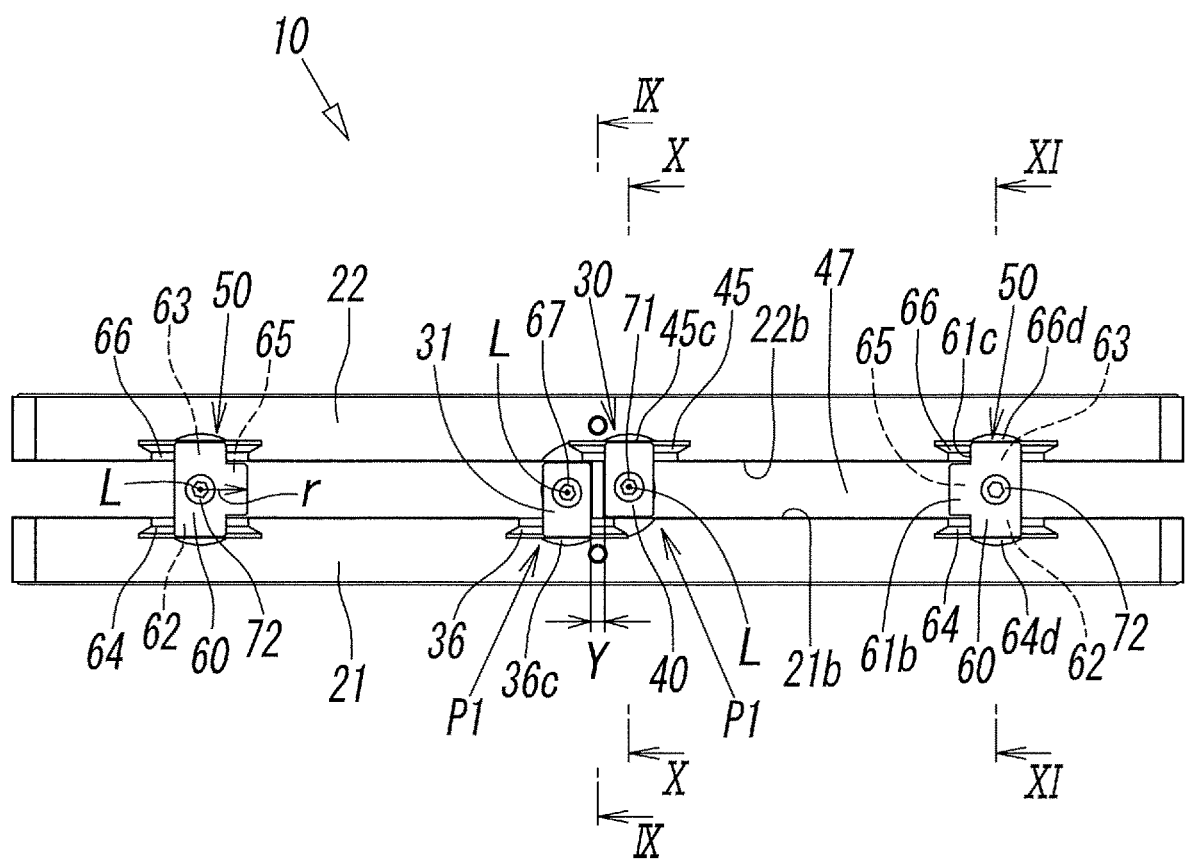
FIG. 8 is a plan view of a gate valve according to a second embodiment of the present invention.
Figure 9:
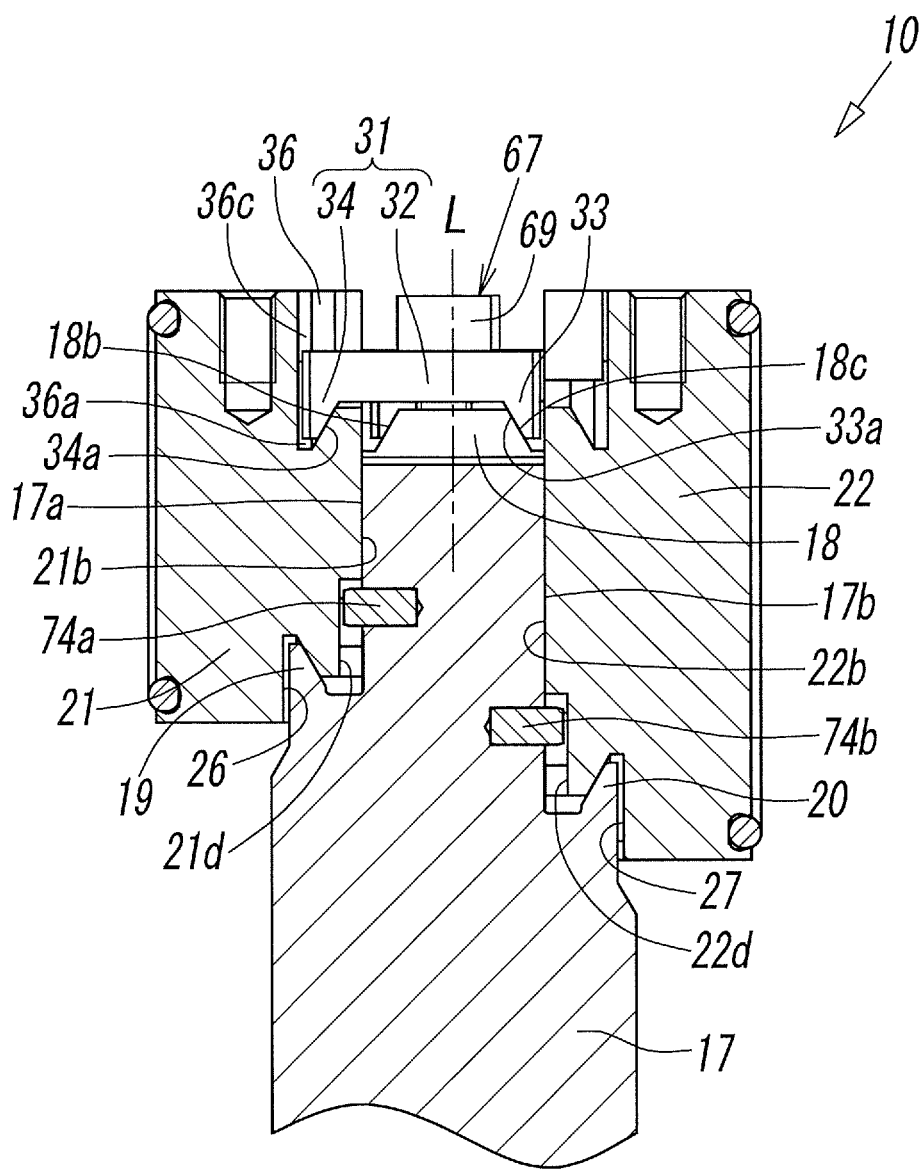
FIG. 9 is a partial cross-sectional view of the gate valve taken along line IX-IX in FIG. 8.
Figure 10:
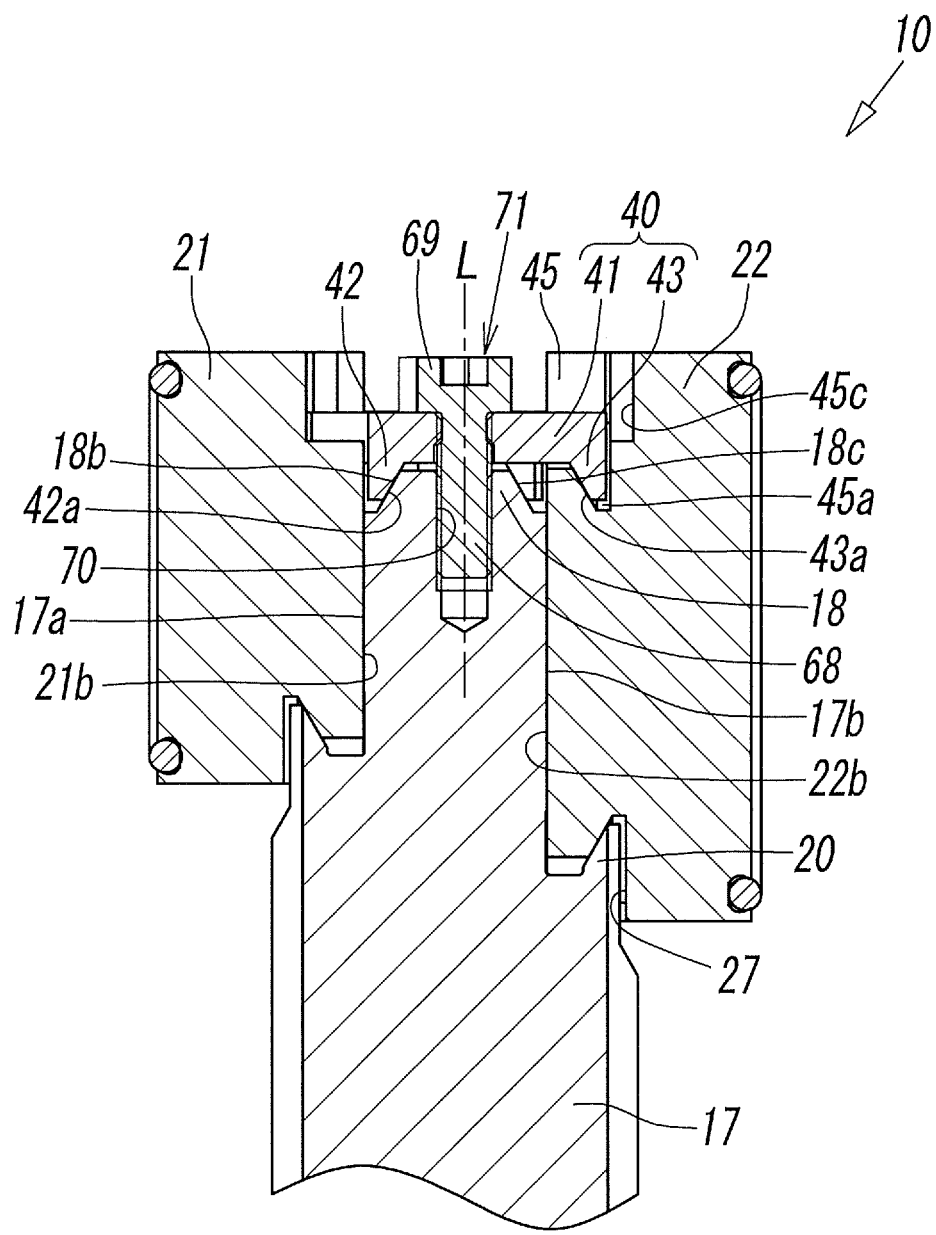
FIG. 10 is a partial cross-sectional view of the gate valve taken along line X-X in FIG. 8.

As illustrated in FIGS. 8, 9, and 10, two protruding parts 18 are provided on a shaft end surface 17c of a valve shaft 17 with a gap interposed therebetween in the left-right direction. One of the two protruding parts 18 fixes a first clamp piece 31, and the other one of the two protruding parts 18 fixes a second clamp piece 40.

The first clamp piece 31 and the second clamp piece 40 are rotatably attached to an upper end part of the valve shaft 17, and a third clamp piece 60 is rotatably attached to an upper end part of a support table 51. Specifically, the first clamp piece 31 is provided so as to be rotatable about an axis of a first fastening bolt 67 when fastening of the first fastening bolt 67 fixed to the valve shaft 17 is loosened, the second clamp piece 40 is provided so as to be rotatable about an axis of a second fastening bolt 71 when fastening of the second fastening bolt 71 fixed to the valve shaft 17 is loosened, and the third clamp piece 60 is provided so as to be rotatable about an axis of a third fastening bolt 72 when fastening of the third fastening bolt 72 fixed to the support table 51 is loosened.

More specifically, a first engagement recessed part 36 provided in an inner surface 21b of the first valve plate 21 which the first clamp piece 31 faces has a first extended recessed part 36c that is recessed so that a first engagement projecting part 34 (leading end part) of the first clamp piece 31 on a first valve plate 21 side dies not make contact with the first engagement recessed part 36 in a case where the first clamp piece 31 is rotated about the axis of the first fastening bolt 67, as illustrated in FIGS. 8 and 9. In the present embodiment, the first extended recessed part 36c is provided from a bottom surface to an upper end of the first engagement recessed part 36 and has an arc shape passing on an outer side in a radial direction relative to a rotation trajectory of the leading end part of the first clamp piece 31 rotated about the axis of the first fastening bolt 67 in plan view.

Furthermore, the first clamp and the second clamp are disposed with a predetermined gap Y interposed therebetween in the left-right direction so that a rear end part of the first clamp piece 31 does not make contact with the second clamp piece 40 disposed adjacent in the left-right direction when the first clamp piece 31 is rotated. Accordingly, the first clamp piece 31 is rotatable about the axis of the first fastening bolt 67 without making contact with the second clamp piece 40. The first clamp piece 31 is rotatable about the axis of the first fastening bolt 67 between an engagement position P1 (see FIG. 8) at which the first engagement projecting part 34 is engaged with the first engagement recessed part 36 and a disengagement position P2 (see FIG. 14) at which the first engagement projecting part 34 is disengaged from the first engagement recessed part 36 in a state where the first fastening bolt 67 is loosened. When the first clamp piece 31 is rotated to the disengagement position P2, the first clamp piece 31 is located within a gap 47 (see FIG. 8) between the first valve plate 21 and the second valve plate 22.

Furthermore, a second engagement recessed part 45 provided in an inner surface 22b of the second valve plate 22 which the second clamp piece 40 faces has a second extended recessed part 45c that is recessed so that a second engagement projecting part 43 (leading end part) of the second clamp piece 40 on a second valve plate 22 side does not make contact with the second engagement recessed part 45 in a case where the second clamp piece 40 is rotated about the axis of the second fastening bolt 71, as illustrated in FIGS. 8 and 10. In the present embodiment, the second extended recessed part 45c is provided from an intermediate position in the up-down direction to an upper end of the second engagement recessed part 45 and has an arc shape passing on an outer side in a radial direction relative to a rotation trajectory of the leading end part of the second clamp piece 40 rotated about the axis of the second fastening bolt 71 in plan view. Accordingly, the second clamp piece 40 can rotate without making contact with the first clamp piece 31. Furthermore, the second clamp piece 40 is rotatable about the axis of the second fastening bolt 71 between an engagement position P1 (see FIG. 8) at which the second engagement projecting part 43 is engaged with the second engagement recessed part 45 and a disengagement position P2 (see FIG. 15) at which the second engagement projecting part 43 is disengaged from the second engagement recessed part 45 in a state where the second fastening bolt 71 is loosened, as in the case of the first clamp piece 31. When the second clamp piece 40 is rotated to the disengagement position P2, the second clamp piece 40 is located within the gap 47 (see FIG. 8) between the first valve plate 21 and the second valve plate 22.

Figure 11:
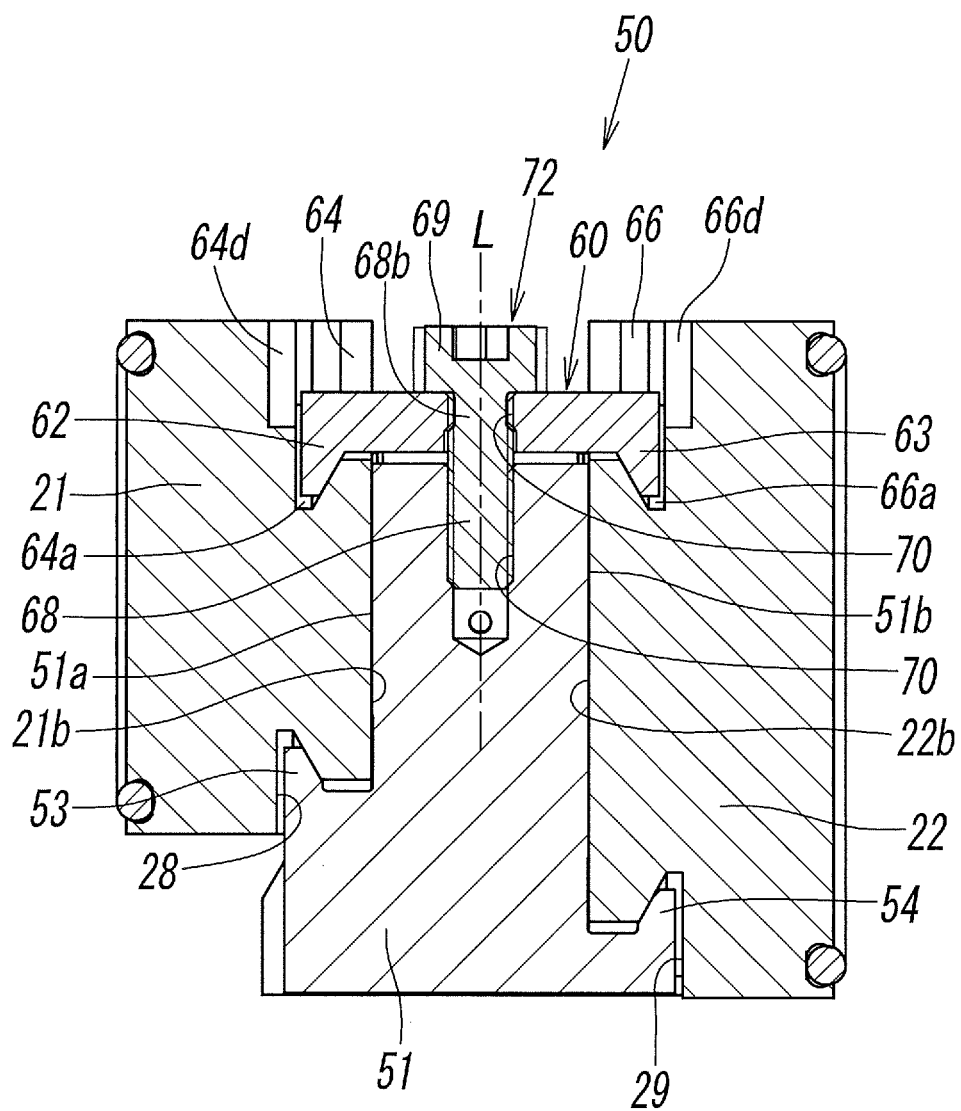
FIG. 11 is a cross-sectional view of the gate valve taken along line XI-XI in FIG. 8.

Furthermore, as illustrated in FIGS. 8 and 11, a third engagement recessed part 64 and a fourth engagement recessed part 66 provided in the inner surfaces 21b and 22b of the first valve plate 21 and the second valve plate 22 which the third clamp piece 60 faces have a third extended recessed part 64d and a fourth extended recessed part 66d that are recessed toward an outer side in the front-rear direction. That is, the third engagement recessed part 64 and the fourth engagement recessed part 66 have the third extended recessed part 64d that is recessed so that a third engagement projecting part 62 (leading end part) of the third clamp piece 60 does not make contact with the third engagement recessed part 64 and the fourth extended recessed part 66d that is recessed so that a fourth engagement projecting part 63 (leading end part) of the third clamp piece 60 does not make contact with the fourth engagement recessed part 66 in a case where the third clamp piece 60 is rotated about the axis of the first fastening bolt 67 in a state where the third engagement projecting part 62 and the fourth engagement projecting part 63 of the third clamp piece 60 are disengaged upward from a third engagement groove 64a and a fourth engagement groove 66a.

Figure 12:
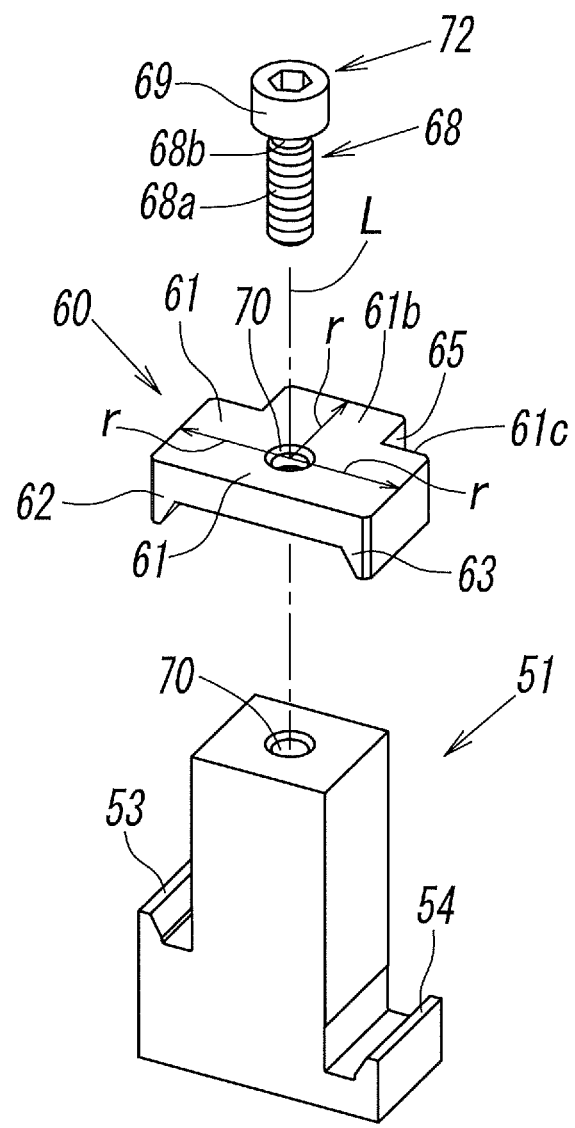
FIG. 12 is an exploded perspective view of a support mechanism.
Figure 14:
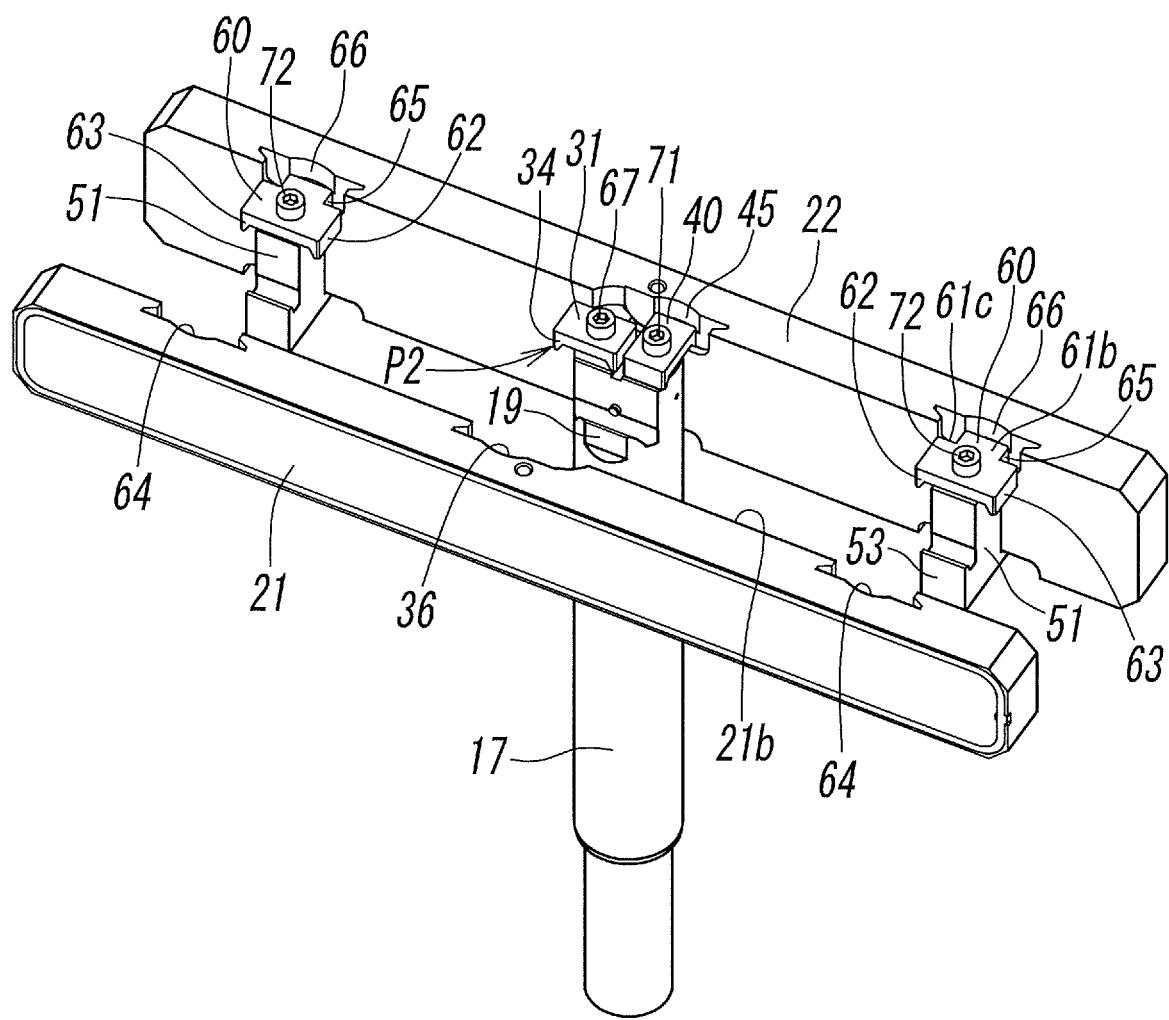
FIG. 14 is a partial perspective view of the gate valve in a state where a first valve plate has been detached.

As illustrated in FIGS. 8, 12, and 14, the third clamp piece 60 has a protruding piece part 61b that protrudes from one side surface 61c of a third clamp body part 61, and the protruding piece part 61b has, at a leading end part thereof in a protruding direction, a fifth engagement projecting part 65 that is engageable with the third engagement recessed part 64 and the fourth engagement recessed part 66. That is, the third clamp piece 60 has the fifth engagement projecting part 65 in addition to the third engagement projecting part 62 and the fourth engagement projecting part 63. The third engagement projecting part 62 and the fourth engagement projecting part 63 are disposed on both sides, in a radial direction, of a rotation center of the third fastening bolt 72 in plan view, the fifth engagement projecting part 65 is disposed art a position deviated by 90 degrees about the axis of the first fastening bolt 67 from the third engagement projecting part 62 and the fourth engagement projecting part 63, and the third engagement projecting part 62, the fourth engagement projecting part 63, and the fifth engagement projecting part 65 are disposed so as to have an identical rotation radius r with respect to the rotation center of the third clamp piece 60.

As illustrated in FIG. 8, in a case where the third clamp piece 60 is rotated so as to cancel, for example, engagement of the first valve plate 21 in a state where the third engagement projecting part 62 and the fourth engagement projecting part 63 are engaged with the third engagement recessed part 64 and the fourth engagement recessed part 66, engagement of the second valve plate 22 is also undesirably canceled. In view of this, the fifth engagement projecting part 65 is provided at a position deviated by 90 degrees about the axis from the third engagement projecting part 62 and the fourth engagement projecting part 63, and thereby, in a case where engagement of the first valve plate 21 is canceled, the third clamp piece 60 can be engaged with the second valve plate 22 by engaging the fifth engagement projecting part 65 with the fourth engagement recessed part 66 (see FIG. 14).

As illustrated in FIG. 9, positioning pins 74a and 74b that protrude toward an outer side in the front-rear direction are provided on a first side surface part 17a and a second side surface part 17b of the valve shaft 17, respectively. In the present embodiment, the positioning pin 74a fits in a positioning groove 21d provided in the first valve plate 21, and the positioning pin 74b fits in a positioning groove 22d provided in the second valve plate 22. The positioning pin 74a is provided on a lower part of the first side surface part 17a, and the positioning pin 74b is provided on a lower part of the second side surface part 17b. The positioning grooves 21d and 22d are opened on a bottom surface of the first valve plate 21 and a bottom surface of the second valve plate 22, respectively, are opened on a valve shaft 17 side, and extend linearly upward. Accordingly, a position of the first valve plate 21 in the left-right direction with respect to the valve shaft 17 can be determined by inserting the positioning pin 74a into the positioning groove 21d. Furthermore, a position of the second valve plate 22 in the left-right direction with respect to the valve shaft 17 can be determined by inserting the positioning pin 74b into the positioning groove 22d.

Next, a case where either one of the first valve plate 21 and the second valve plate 22 attached to the valve shaft 17 is detached is described. In the present embodiment, first, a case where the first valve plate 21 is detached is described. As illustrated in FIG. 11, first, the third fastening bolt 72 of the third clamp piece 60 attached to each of the two support tables 51 is rotated in a loosening direction. As a result of the rotation of the third fastening bolt 72, the third clamp piece 60 moves upward, and the third engagement projecting part 62 is disengaged from the third engagement groove 64a of the third engagement recessed part 64, and the fourth engagement projecting part 63 is disengaged from the fourth engagement groove 66a of the fourth engagement recessed part 66. Then, as illustrated in FIG. 14, the two third clamp pieces 60 disposed on the left and right are rotated about the axis in plan view, and thereby the third engagement projecting part 62 is disengaged from the third engagement recessed part 64, the fourth engagement projecting part 63 is disengaged from the fourth engagement recessed part 66, and the fifth engagement projecting part 65 is locked with the fourth engagement recessed part 66.

Then, the first fastening bolt 67 of the first clamp piece 31 attached to the valve shaft 17 illustrated in FIG. 9 is rotated in a loosening direction. As a result of the rotation of the first fastening bolt 67, the first clamp piece 31 moves upward, and the first engagement projecting part 34 is disengaged from the first engagement groove 36a of the first engagement recessed part 36. Then, as illustrated in FIG. 14, the first engagement projecting part 34 is disengaged from the first engagement recessed part 36 by rotating the first clamp piece 31 in a clockwise direction in plan view. As a result, when the first valve plate 21 is lifted upward relative to the valve shaft 17, the first valve plate 21 can be detached from the valve shaft 17 and the support tables 51.

Next, a case where the first valve plate 21 is attached to the valve shaft 17 is described. First, as illustrated in FIG. 14, the first valve plate 21 is disposed so as to be opposed to the second valve plate 22 in such a posture that the inner surface 21b faces the valve shaft 17. Then, a first protruding part 19 of the valve shaft 17 is inserted into a lower engagement recessed part 26 of the first valve plate 21 (see FIG. 9), and at the same time, a third protruding part 53 provided in a lower part of each of the two support tables 51 is inserted into a lower engagement recessed part 28 of the first valve plate 21 (see FIG. 11). Then, the inner surface 21b of the first valve plate 21 is brought into contact with the first side surface part 17a of the valve shaft 17, and the positioning pin 74a is inserted into the positioning groove 21d provided in the inner surface 21b of the first valve plate 21 (see FIG. 9).

Then, as illustrated in FIGS. 9 and 14, the first engagement projecting part 34 is inserted into the first engagement recessed part 36 by rotating the first clamp piece 31 about the axis of the first fastening bolt 67. Then, when the first fastening bolt 67 is tightly fastened to the valve shaft 17, the first engagement projecting part 34 is engaged with the first engagement groove 36a, and thereby the first valve plate 21 is fastened in close contact with the first side surface part 17a of the valve shaft 17 by the first clamp piece 31.

Then, as illustrated in FIGS. 11 and 14, when the third clamp piece 60 attached to an upper end of one (e.g., left one) of the two support tables 51 is rotated about the axis of the third fastening bolt 72, the fourth engagement projecting part 63 is inserted into the fourth engagement recessed part 66, and the third engagement projecting part 62 is inserted into the third engagement recessed part 64 after engagement of the fifth engagement projecting part 65 with the second valve plate 22 is canceled. Then, when the third fastening bolt 72 is tightly fastened and fixed to the valve shaft 17, the fourth engagement projecting part 63 is engaged with the fourth engagement groove 66a, the third engagement projecting part 62 is engaged with the third engagement groove 64a, and the first valve plate 21 and the second valve plate 22 are fastened to each other by the third clamp piece 60 in a state where the support table 51 is held between the first valve plate 21 and the second valve plate 22 on one side in the left-right direction of the first valve plate 21 and the second valve plate 22.

Figure 13:
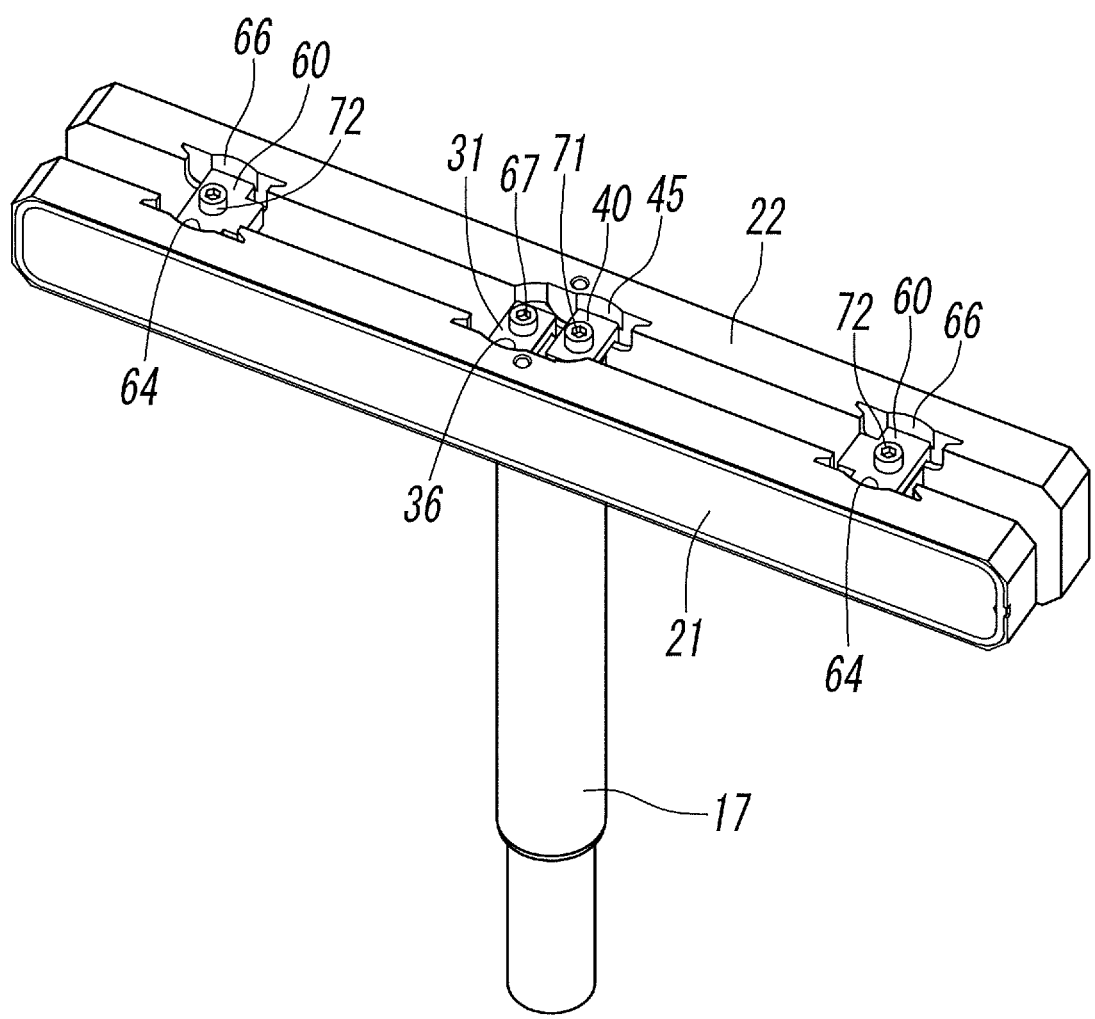
FIG. 13 is a partial perspective view of the gate valve.

Then, by operating the other one of the two support tables 51 in a similar manner to the one support table 51, the first valve plate 21 and the second valve plate 22 are fastened to each other by the third clamp piece 60 in a state where the support table 51 is held between the first valve plate 21 and the second valve plate 22 on the other side in the left-right direction of the first valve plate 21 and the second valve plate 22. As a result, the first valve plate 21 can be attached to the valve shaft 17 in a state where the first valve plate 21 and the second valve plate 22 are fastened to each other, as illustrated in FIG. 13.

Next, a case where the second valve plate 22 is detached is described. As illustrated in FIG. 11, first, the third fastening bolt 72 of the third clamp piece 60 attached to each of the two support tables 51 is rotated in a loosening direction. As a result of the rotation of the third fastening bolt 72, the third clamp piece 60 is moved upward, and the third engagement projecting part 62 and the fourth engagement projecting part 63 are disengaged from the third engagement groove 64a and the fourth engagement groove 66a, respectively. Then, as illustrated in FIG. 15, the two third clamp pieces 60 disposed on the left and right in plan view are rotated about the axis, and thereby the third engagement projecting part 62 is disengaged from the third engagement recessed part 64, the fourth engagement projecting part 63 is disengaged from the fourth engagement recessed part 66, and the fifth engagement projecting part 65 is locked with the third engagement recessed part 64.

Then, the second fastening bolt 71 of the second clamp piece 40 attached to the valve shaft 17 illustrated in FIG. 10 is rotated in a loosening direction. As a result of the rotation of the second fastening bolt 71, the second clamp piece 40 moves upward, and the second engagement projecting part 43 is disengaged from a second engagement groove 45a of the second engagement recessed part 45. Then, as illustrated in FIG. 15, the second engagement projecting part 43 is disengaged from the second engagement recessed part 45 by rotating the second clamp piece 40 in a clockwise direction in plan view. As a result, when the second valve plate 22 is lifted upward relative to the valve shaft 17, the second valve plate 22 can be detached from the valve shaft 17 and the support tables 51.

Next, a case where the second valve plate 22 is attached to the valve shaft 17 is described. First, as illustrated in FIG. 15, the second valve plate 22 is disposed so as to be opposed to the first valve plate 21 in such a posture that the inner surface 22b faces the valve shaft 17. Then, a second protruding part 20 of the valve shaft 17 is inserted into a lower engagement recessed part 27 of the second valve plate 22 (see FIG. 10), and a fourth protruding part 54 provided in a lower part of each of the two support tables 51 is inserted into a lower engagement recessed part 29 of the second valve plate 22 (see FIG. 11). Then, the inner surface 22b of the second valve plate 22 is brought into contact with the second side surface part 17b of the valve shaft 17, and the positioning pin 74b is inserted into the positioning groove 22d provided in the inner surface 22b of the second valve plate 22 (see FIG. 9).

Figure 15:
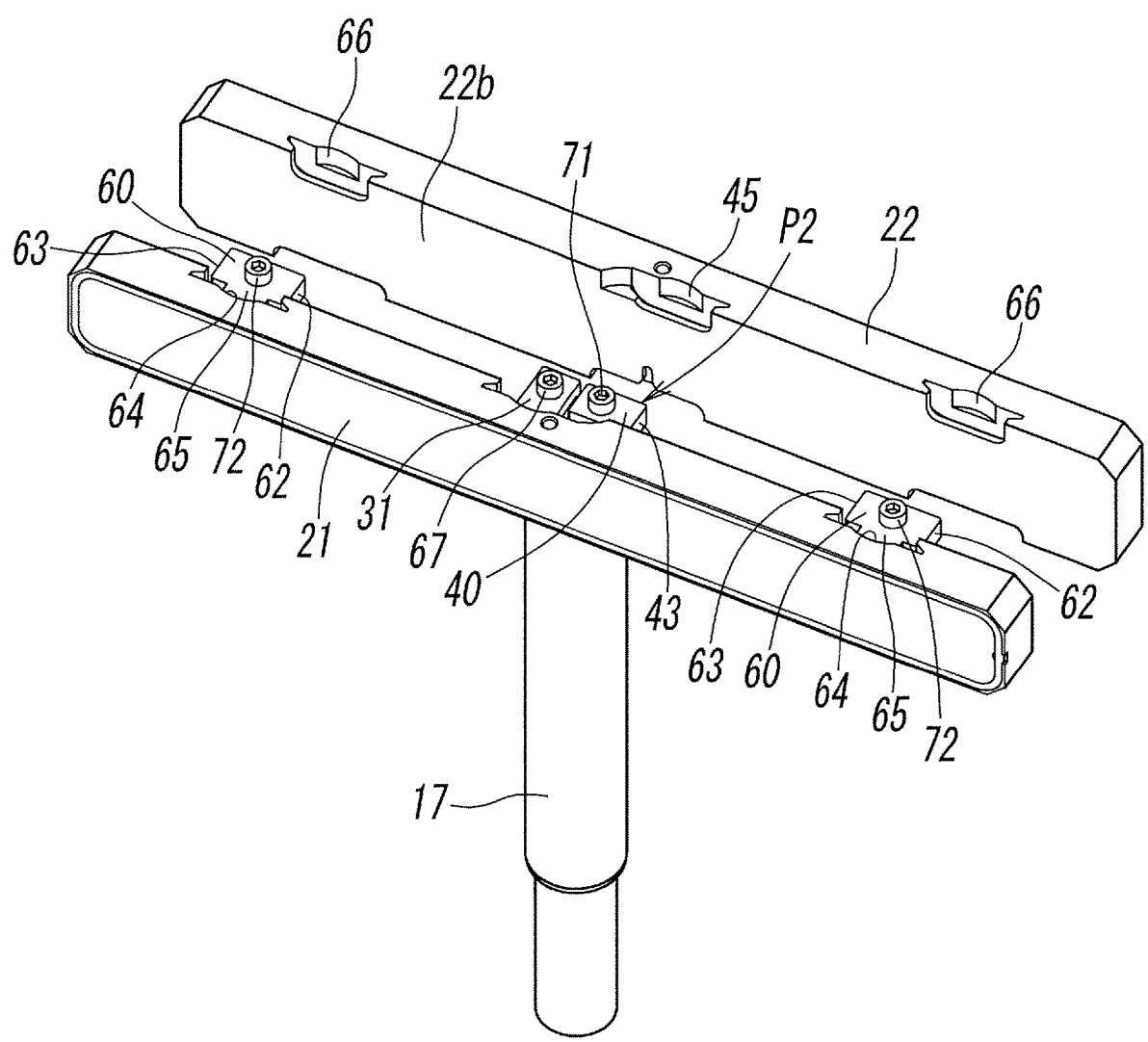
FIG. 15 is a partial perspective view of the gate valve in a state where a second valve plate has been detached.

Then, as illustrated in FIGS. 10 and 15, the second engagement projecting part 43 is inserted into the second engagement recessed part 45 by rotating the second clamp piece 40 about the axis of the second fastening bolt 71. Then, when the second fastening bolt 71 is rotated in a fastening direction, the second clamp piece 40 moves downward, and the second engagement projecting part 43 is inserted into the second engagement groove 45a. Then, when the first fastening bolt 67 is tightly fastened and fixed to the valve shaft 17 by further rotating the first fastening bolt 67 in the fastening direction, the second valve plate 22 is fastened in close contact with the second side surface part 17b of the valve shaft 17 by the second clamp piece 40.

Then, as illustrated in FIGS. 11 and 15, when the third clamp piece 60 attached to the upper end of one of the two support tables 51 in the longitudinal direction is rotated, the third engagement projecting part 62 is inserted into the third engagement recessed part 64, and the fourth engagement projecting part 63 is inserted into the fourth engagement recessed part 66 after engagement of the fifth engagement projecting part 65 with the first valve plate 21 is canceled. Then, when the third fastening bolt 72 is rotated in a fastening direction, the third clamp piece 60 moves downward, and the third engagement projecting part 62 is engaged with the third engagement groove 64a, and the fourth engagement projecting part 63 is engaged with the fourth engagement groove 66a. Then, when the third fastening bolt 72 is firmly fastened to the third clamp piece 60, one side in the longitudinal direction of the first valve plate 21 and one side in the longitudinal direction of the second valve plate 22 are fastened to each other with the support table 51 interposed therebetween.

Then, by operating the other one of the two support tables 51 on the other side in the longitudinal direction in a similar manner to the one support table 51, the other side in the longitudinal direction of the first valve plate 21 and the other side in the longitudinal direction of the second valve plate 22 are coupled to each other with the support table 51 interposed therebetween. As a result, the second valve plate 22 can be attached to the valve shaft 17, as illustrated in FIG. 13.

As described above, according to the gate valve 10 according to the second embodiment, the first valve plate 21 or the second valve plate 22 can be detachably attached to the valve shaft 17 just by rotating the first clamp piece 31, the second clamp piece 40, and the third clamp piece 60 while loosening fastening of the first to third fastening bolts 67, 71, and 72.

Third Embodiment

Next, a third embodiment of the gate valve 10 according to the present invention is described. In the third embodiment, differences from the first and second embodiments are mainly described, and parts identical to those in the first and second embodiments are given identical reference signs, and description thereof is omitted.

Figure 16:
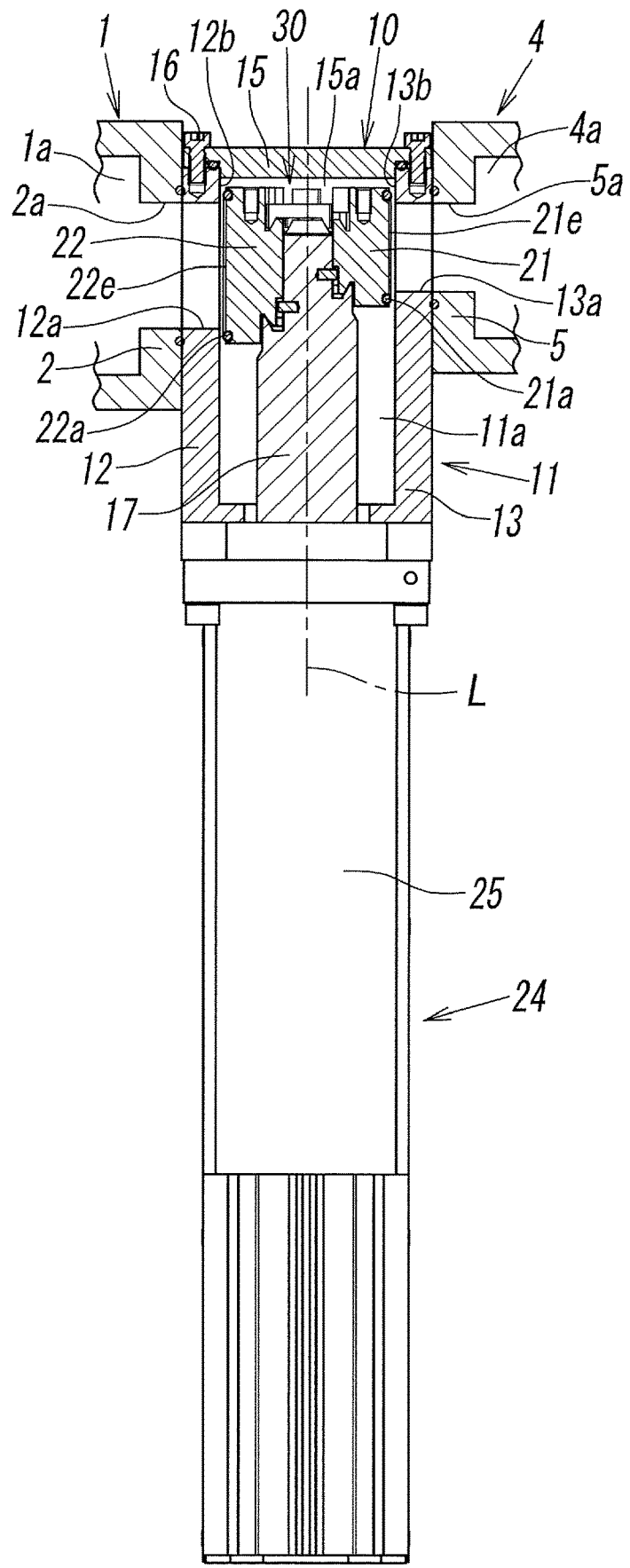
FIG. 16 is a cross-sectional view of a gate valve according to a third embodiment of the present invention.

Although the gate valves 10 according to the above embodiments have the valve shaft 17, the first valve plate 21, the second valve plate 22, and the operation mechanism 24, a gate valve according to the present embodiment further has a valve body 11 in which the first valve plate 21 and the second valve plate 22 are stored. Note that in the present embodiment, a case where a gate valve 10 is disposed between a first chamber 1 and a second chamber 4 that are adjacent to each other as illustrated in FIG. 16 is described.

First, the first chamber 1 and the second chamber 4 are briefly described. The first chamber 1 is a transfer chamber in which a transport device for transporting a workpiece such as a semiconductor substrate into and out of the second chamber 4 is stored, and the second chamber 4 is a process chamber in which the workpiece is processed under vacuum atmosphere.

The first chamber 1 and the second chamber 4 have a first chamber opening 2a and a second chamber opening 5a through which the workpiece to be transported into and out of the chamber passes, respectively. The first chamber opening 2a is communicated with a first gate opening (first opening) 12a provided in the valve body 11 of the gate valve 10, and the second chamber opening 5a is communicated with a second gate opening (first opening) 13a provided in the gate valve 10. The chamber openings 2a and 5a are communicated with each other or individually opened and closed by the first valve plate 21 and the second valve plate 22 provided in the gate valve 10, and thereby the first chamber 1 or the second chamber 4 is hermetically sealed.

The first chamber 1 and the second chamber 4 have a box shape that is hollow inside, and have a first chamber wall 2 and a second chamber wall 5 extending along a front wall (side wall) 12 and a rear wall (side wall) 13 disposed on both sides in the front-rear direction of the valve body 11, respectively. The first chamber wall 2 has the first chamber opening 2a leading to a transport space 1a of the first chamber 1, and the second chamber wall 5 has the second chamber opening 5a leading to a processing space 4a of the second chamber 4. The first chamber opening 2a and the second chamber opening 5a have substantially rectangular shapes similar to each other, and extend in the left-right direction (longitudinal direction) orthogonal to the front-rear direction. Note that the first chamber opening 2a and the second chamber opening 5a may have an identical shape.

Figure 17:
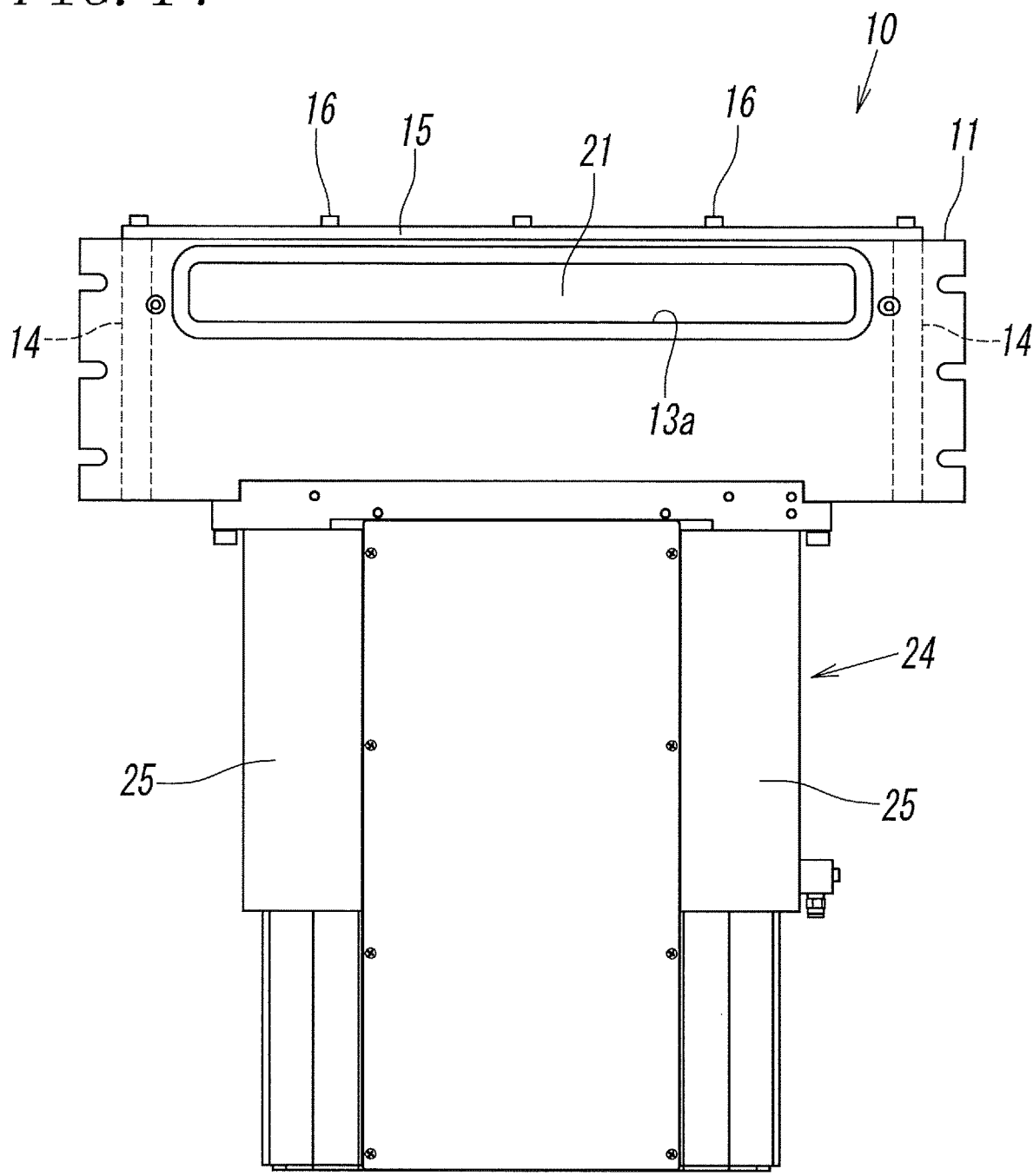
FIG. 17 is a back view of the gate valve.

As illustrated in FIGS. 16 and 17, the gate valve 10 has the hollow valve body 11 that has the first gate opening 12a and the second gate opening 13a and has a valve space 11a inside, the first valve plate 21 and the second valve plate 22 that open and close communication between the pair of first gate opening 12a and second gate opening 13a (that is, allow the gate openings 12a and 13a to be communicated with each other through the valve space 11a or hermetically cut off the gate openings 12a and 13a from each other) by operation of the valve shaft 17, the valve shaft 17 coupled to the valve plates 21 and 22, and an operation mechanism 24 for performing an operation of opening and closing the first valve plate 21 and the second valve plate 22 by the valve shaft 17.

In the present embodiment, the operation mechanism 24 is disposed on a bottom part of the valve body 11, and the valve shaft 17 protrudes from the bottom part of the valve body 11 into the valve space 11a. The front wall 12 disposed on a front side of the valve body and the rear wall 13 disposed on a rear side of the valve body have the first gate opening 12a and the second gate opening 13a, and these gate openings 12a and 13a face each other.

The first valve plate 21 closes the second gate opening 13a in such a manner that a seal member 21a of the first valve plate 21 is pressed against a valve seal surface 13b around the second gate opening 13a of the rear wall 13, and the second valve plate 22 closes the first gate opening 12a in such a manner that a seal member 22a of the second valve plate 22 is pressed against a valve seal surface 12b around the first gate opening 12a of the front wall 12.

Two air cylinders 25 that constitute the operation mechanism 24 are for performing an operation of opening and closing the first valve plate 21 and the second valve plate 22 with use of the valve shaft 17. Specifically, the first valve plate 21 and the second valve plate 22 are switchable by these air cylinders 25 among a first closed position at which the seal member 22a of the second valve plate 22 closes the first gate opening 12a by being pressed against the valve seal surface 12b around the first gate opening 12a, a second closed position at which the seal member 21a of the first valve plate 21 closes the second gate opening 13a by being pressed against the valve seal surface 13b around the second gate opening 13a, and an evacuation position at which the first and second gate openings 12a and 13a are communication with each other.

Note that the evacuation position may include an intermediate position at which the first valve plate 21 and the second valve plate 22 are located at intermediate positions of the first and second gate openings 12a and 13a and the first and second gate openings 12a and 13a are communicated with each other and a lower position below the intermediate position or may be a lower position to which the first valve plate 21 is movable from the first closed position or the second valve plate 22 is directly movable from the second closed position in a state where the first valve plate 21 has moved to the first closed position or the second valve plate 22 has moved to the second closed position.

The valve body 11 has the front wall 12 and the rear wall 13 that face each other with a gap interposed therebetween in the front-rear direction, a pair of side walls 14 that connect both end parts in the left-right direction of the front wall 12 and the rear wall 13, and a ceiling wall 15 that covers an upper opening 15a opened on an upper side of these walls. The first gate opening 12a and the second gate opening 13a that are provided in the front wall 12 and the rear wall 13 have an oblong shape extending in the left-right direction, and the first gate opening 12a and the first chamber opening 2a of the first chamber 1 have similar shapes and are communicated with each other. Note that the first gate opening 12a and the second gate opening 13a may have an identical shape.

The ceiling wall 15 is detachably attached to upper end parts of the front wall 12, the rear wall 13, and the pair of side walls 14. In the present embodiment, the ceiling wall 15 is detachably attached to these walls by a fastening member such as a bolt 16.

In a case where the first valve plate 21 or the second valve plate 22 is detached from the valve shaft 17 in the gate valve 10 according to the present embodiment, the first valve plate 21 or the second valve plate 22 is exposed through the upper opening 15a that is opened by detaching the ceiling wall 15 from the valve body 11, as illustrated in FIG. 16. In a case where the first valve plate 21 is detached from the valve shaft 17, the first valve plate 21 is detached from the valve shaft 17 by performing detaching work similar to those in the first and second embodiments after the second valve plate 22 is moved to the second closed position. Furthermore, in a case where the second valve plate 22 is detached from the valve shaft 17, the second valve plate 22 is detached from the valve shaft 17 by performing detaching work similar to those in the first and second embodiments after the first valve plate 21 is moved to the first closed position.

Meanwhile, in a case where the detached first valve plate 21 is attached to the valve shaft 17, the first valve plate 21 attached through the upper opening 15a of the valve body 11 that is opened by detaching the ceiling wall 15 is inserted into the valve space 11a of the valve body 11 in a state where the second valve plate 22 has been moved to the second closed position. Then, the first valve plate 21 is attached to the valve shaft 17 by performing attaching work similar to those in the first and second embodiments. In a case where the detached second valve plate 22 is attached to the valve shaft 17, the second valve plate 22 attached through the upper opening 15a of the valve body 11 that is opened by detaching the ceiling wall 15 is inserted into the valve space 11a of the valve body 11 in a state where the first valve plate 21 has been moved to the first closed position. Then, the second valve plate 22 is attached to the valve shaft 17 by performing attaching work similar to those in the first and second embodiments.

As described above, according to the gate valve 10 according to the present embodiment, work of detaching and attaching the first valve plate 21 or the second valve plate 22 can be easily performed through the upper opening 15a by detaching the ceiling wall 15 from the valve body 11. Furthermore, since the first to third fastening bolts 67, 71, and 72 inserted into the first to third clamp pieces 31, 40, and 60 can be prevented from coming off, it is possible to prevent the fastening bolts 67, 71, and 72 from falling into the valve body 11 during work of replacing the first valve plate 21 or the second valve plate 22. Therefore, it is possible to improve workability during maintenance of the valve plates 21 and 22.

Although a case where the first clamp piece 31, the second clamp piece 40, and the third clamp piece 60 of the fastening mechanism 30 and the support mechanism 50 are configured such that the engagement projecting parts 34, 43, 62, and 63 have a convex shape and the engagement recessed parts 36, 45, 64, and 66 engaged with the engagement projecting parts 34, 43, 62, and 63 have a concave shape has been illustrated in the above embodiments, this is not restrictive. The first clamp piece 31, the second clamp piece 40, and the third clamp piece 60 may each have concave-shaped engagement recessed parts (not illustrated), and the first and second valve plates 21 and 22 may each have convex-shaped engagement projecting parts (not illustrated) engaged with the concave-shaped engagement recessed parts. Furthermore, although a case where a pair of support mechanisms 50 held between the valve plates 21 and 22 are disposed at both end parts in the longitudinal direction of the first valve plate 21 and the second valve plate 22 that face each other has been described in the above embodiments, this is not restrictive, and one or more other pairs of support mechanisms 50 may be further disposed between the valve plates 21 and 22 on an inner side in the longitudinal direction of the pair of support mechanisms 50.

REFERENCE SIGNS LIST 10 gate valve
11 valve body
11a valve space
12 front wall (side wall)
12a first gate opening (first opening)
13 rear wall (side wall)
13a second gate opening (second opening)
14 side wall
15 ceiling wall
17 valve shaft
17a first side surface part
17b second side surface part
17c shaft end surface 19 first protruding part (part to be engaged, projecting part)
20 second protruding part (part to be engaged, projecting part)
21 first valve plate
21b, 22b inner surface
21e, 22e seal surface (external surface)
22 second valve plate
24 operation mechanism
26, 27 lower engagement recessed part (engaging part, recessed part)
28, 29 lower engagement recessed part (base-end-side engaging part, recessed part)
30 fastening mechanism
31 first clamp piece
32 first clamp body part
33 body locking claw (first locking claw)
34 first engagement projecting part
36 first engagement recessed part
36c first extended recessed part
40 second clamp piece
41 second clamp body part
42 body locking claw (second locking claw)
43 second engagement projecting part
45 second engagement recessed part
45c second extended recessed part
47 gap
50 support mechanism
51 support table
51c support end surface
53 third protruding part (base-end-side engagement projecting part, projecting part)
54 fourth protruding part (base-end-side engagement projecting part, projecting part)
60 third clamp piece
61 third clamp body part
61b protruding piece part
62 third engagement projecting part
63 fourth engagement projecting part
64 third engagement recessed part
64d third extended recessed part
65 fifth engagement projecting part
66 fourth engagement recessed part
67 first fastening bolt (first fastening member)
68a male thread part
68b small-diameter part (unthreaded part)
70 female thread part (screw hole)
71 second fastening bolt (second fastening member)
72 third fastening bolt (third fastening member)
L axis
P1 engagement position
P2 disengagement position

The invention claimed is:

1. A gate valve that is disposed between a first chamber and a second chamber that are adjacent to each other and allows a first opening leading to the first chamber and a second opening leading to the second chamber to be communicated with each other or individually opens and closes the first opening and the second opening, the gate valve comprising:
a valve shaft that extends in an axial direction from a base end side toward a leading end side;
a first valve plate and a second valve plate that are attached to a leading end part of the valve shaft in the axial direction, extending in a direction orthogonal to the axial direction, and have inner surfaces that face the valve shaft and external surfaces on which annular seal members are provided and that face a side opposite to the inner surfaces; and
an operation mechanism that moves the first and second valve plates to an evacuation position at which the first opening and the second opening are communicated with each other, a first closed position at which the first opening is closed by the external surface of the first valve plate, and a second closed position at which the second opening is closed by the external surface of the second valve plate by operating the valve shaft,
wherein the gate valve further comprises:
a fastening mechanism that detachably attaches the first and second valve plates to the leading end part of the valve shaft by disengageably fastening the first and second valve plates and the valve shaft to each other in a state where the inner surface of the first valve plate and the inner surface of the second valve plate are in contact with the leading end part of the valve shaft and the leading end part of the valve shaft is held between the valve plates; and
at least one pair of support mechanisms that disengageably fasten the valve plates to each other at least at both end parts of the first and second valve plates in a longitudinal direction.

2. The gate valve according to claim 1, wherein
the fastening mechanism has:
a first clamp piece that is disposed so as to straddle the valve shaft and the first valve plate from a leading end side of the valve shaft in the axial direction, is disengageably engaged with the first valve plate, and is detachably fixed to the valve shaft,
a second clamp piece that is disposed so as to straddle the valve shaft and the second valve plate from the leading end side of the valve shaft in the axial direction, and is disengageably engaged with the second valve plate, and is detachably fixed to the valve shaft, and
a first fastening member and a second fastening member that detachably fix the first clamp piece and the second clamp piece to the leading end part of the valve shaft, respectively;
base-end-side end parts of the first and second valve plates in the axial direction are concave-convex engaged with the leading end part of the valve shaft from the leading end side of the valve shaft;
in a state where the first and second clamp pieces are fixed to the valve shaft by the first and second fastening members, leading end parts of the first and second valve plates are pressed toward the inner surfaces thereof, respectively by engagement of the first and second clamp pieces and the first and second valve plates, and base-end-side end parts of the first and second valve plates are pressed toward the inner surfaces thereof, respectively by concave-convex engagement of the base-end-side end parts of the valve plates and the leading end part of the valve shaft; and
the first and second valve plate are thus fastened to the leading end part of the valve shaft.

3. The gate valve according to claim 2, wherein
the concave-convex engagement of the base-end-side end parts of the valve plates and the leading end part of the valve shaft is formed by engagement of engaging parts provided in base end parts of the pair of valve plates and a pair of parts to be engaged provided in the leading end part of the valve shaft, the engaging parts are any one of recessed parts and projecting parts engaged with the recessed parts, and the parts to be engaged are the other one of the recessed parts and the projecting parts;

the first valve plate and the second valve plate have, at central parts of the inner surfaces thereof in the longitudinal direction, a first engagement recessed part and a second engagement recessed part that are opened toward the leading end side in the axial direction;

the first clamp piece and the second clamp piece have a first engagement projecting part and a second engagement projecting part to be engaged with the first and second engagement recessed parts;

the first clamp piece is fixed to the valve shaft by the first fastening member in a state where the first engagement projecting part is engaged with the first engagement recessed part and the engaging part of the first valve plate and the part to be engaged of the valve shaft are engaged with each other, and thereby the first engagement projecting part causes pressing force in a direction of the inner surface of the first valve plate to act on the first engagement recessed part, and the engaging part causes pressing force in the direction of the inner surface of the first valve plate to act on the part to be engaged, and the first valve plate is thus fastened to the valve shaft;

the second clamp piece is fixed to the valve shaft by the second fastening member in a state where the second engagement projecting part is engaged with the second engagement recessed part and the engaging part of the second valve plate and the part to be engaged of the valve shaft are engaged with each other, and thereby the second engagement projecting part causes pressing force in a direction of the inner surface of the second valve plate to act on the second engagement recessed part, and the engaging part causes pressing force in the direction of the inner surface of the second valve plate to act on the part to be engaged, and the second valve plate is thus fastened to the valve shaft.

4. The gate valve according to claim 3, wherein
the first and second fastening members are a first fastening bolt and a second fastening bolt;
the valve shaft has, in a leading end surface thereof in the axial direction, a screw hole with which the fastening bolts are screwed;
the first and second clamp pieces have through-holes through which the first and second fastening bolts are inserted; and
the first clamp piece is fixed to the valve shaft by inserting the first fastening bolt through the through-hole of the first clamp piece and screwing the first fastening bolt with the screw hole of the valve shaft, and the second clamp piece is fixed to the valve shaft by inserting the second fastening bolt through the through-hole of the second clamp piece and screwing the second fastening bolt with the screw hole of the valve shaft.

5. The gate valve according to claim 4, wherein
the first clamp piece has the first engagement projecting part on one end side relative to the through-hole and has a first locking claw on the other end side;
the first locking claw is locked on the valve shaft toward the first engagement projecting part in a state where the first clamp piece is fixed by the first fastening bolt;
the second clamp piece has the second engagement projecting part on one end side relative to the through-hole and has a second locking claw on the other end side; and the second locking claw is locked on the valve shaft toward the second engagement projecting part in a state where the second clamp piece is fixed by the second fastening bolt.

6. The gate valve according to claim 4, wherein
the first clamp piece is rotatable about an axis of the first fastening bolt between an engagement position at which the first engagement projecting part is engaged with the first engagement recessed part and a disengagement position at which the first engagement projecting part is disengaged from the first engagement recessed part in a state where the first fastening bolt is loosened;
the first clamp piece is stored in a gap between the inner surface of the first valve plate and the inner surface of the second valve plate in a case where the first clamp piece is rotated from the engagement position to the disengagement position;
the second clamp piece is rotatable about an axis of the second fastening bolt between an engagement position at which the second engagement projecting part is engaged with the second engagement recessed part and a disengagement position at which the second engagement projecting part is disengaged from the second engagement recessed part in a state where the second fastening bolt is loosened; and
the second clamp piece is stored in the gap between the inner surface of the first valve plate and the inner surface of the second valve plate in a case where the second clamp piece is rotated from the engagement position to the disengagement position.

7. The gate valve according to claim 6, wherein
the first and second fastening bolts have a shaft part that extends in the axial direction, a head part that is provided at a leading end part of the shaft part in the axial direction, and a male thread part that is provided on an outer circumferential surface of the shaft part;
a female thread part with which the male thread part is screwable is provided on inner surfaces of the through-holes provided in the first and second clamp pieces;
the shaft part has, at a part thereof closer to the head part than the male thread part, a small-diameter part having an external diameter smaller than an inner diameter of the female thread part;
the small-diameter part is inserted through the through-holes; and
an end part of the male thread part on a head part side makes contact with the female thread parts of the first and second clamp pieces when the first and second fastening bolts are loosened.

8. The gate valve according to claim 1, wherein
the pair of the support mechanisms have:
at least one pair of support tables held between the first valve plate and the second valve plate at least at both end parts of the first valve plate and the second valve plate in the longitudinal direction,
a third clamp piece that is disposed so as to straddle the first valve plate and the second valve plate from a leading end side of each of the pair of support tables in the axial direction, is disengageably engaged with the first and second valve plates, and is detachably fixed to the support table, and
a third fastening member that detachably fixes the third clamp piece to a leading end part of the support table in the axial direction;

base-end-side end parts of the first and second valve plates in the axial direction are concave-convex engaged with the support table from a leading end side of the support table;

the third clamp piece is fixed to the support table by the third fastening member in a state where the third clamp piece is engaged with the first and second valve plates and the base-end-side end parts of the pair of valve plates and the support table are concave-convex engaged with each other, and thereby leading end parts and the base-end-side end parts of the first and second valve plates are pressed toward the inner surfaces thereof; and the first and second valve plates and the support table are thus fastened to each other.

9. The gate valve according to claim 8, wherein the concave-convex engagement of the base-end-side end parts of the pair of valve plates and the support table is formed by engagement of base-end-side engagement recessed parts provided at base-end-side end parts of the pair of valve plates and a pair of base-end-side engagement projecting parts provided on the support table;

the first valve plate and the second valve plate have, at least at both end parts of the inner surfaces thereof in the longitudinal direction, a third engagement recessed part and a fourth engagement recessed part that are opened toward a leading end side in the axial direction;

the third clamp piece has a third engagement projecting part and a fourth engagement projecting part to be engaged with the third engagement recessed part and the fourth engagement recessed part; and the third clamp piece is fixed to the support table by the third fastening member in a state where the third engagement projecting part and the fourth engagement projecting part are engaged with the third engagement recessed part and the fourth engagement recessed part and the base-end-side engagement recessed parts of the first and second valve plates and the base-end-side engagement projecting parts of the support table are engaged with each other, and thereby the third engagement projecting part and the fourth engagement projecting part cause pressing force in a direction of the inner surface of the first valve plate to act on the third engagement recessed part and the fourth engagement recessed part, respectively, and the base-end-side engagement recessed parts cause pressing force in the direction of the inner surface of the first valve plate to act on the base-end-side engagement projecting parts, and the first and second valve plates and the support table are thus fastened to each other.

10. The gate valve according to claim 9, wherein the third fastening member is a third fastening bolt;

the support table has, in a leading end surface thereof in the axial direction, a screw hole with which the third fastening bolt is screwed;

the third clamp piece has a through-hole through which the third fastening bolt is inserted; and the third clamp piece is fixed to the support table by inserting the third fastening bolt into the through-hole of the third clamp piece and screwing the third fastening bolt with the screw hole of the support table.

11. The gate valve according to claim 10, wherein the third engagement recessed part, the fourth engagement recessed part, and the base-end-side engagement recessed parts extend in a longitudinal direction of the valve plates and outer-side ends thereof are opened toward an outer side in the longitudinal direction; and each of the support mechanisms is detachable from the first and second valve plates by loosening the third fastening bolt and sliding the third engagement projecting part and the fourth engagement projecting part along the third engagement recessed part and the fourth engagement recessed part and sliding the base-end-side engagement recessed parts along the base-end-side engagement projecting parts in a state where the third engagement projecting part and the fourth engagement projecting part of the third clamp piece are engaged with the third engagement recessed part and the fourth engagement recessed part of the first and second valve plates and the base-end-side engagement recessed parts are engaged with the base-end-side engagement projecting parts.

12. The gate valve according to claim 10, wherein the third clamp piece is rotatable about an axis of the third fastening bolt by loosening the third fastening bolt from a state where the third engagement projecting part is engaged with the third engagement recessed part and the fourth engagement projecting part is engaged with the fourth engagement recessed part;

the third clamp piece further has a protruding piece part that protrudes in a radial direction about the third fastening bolt;

the protruding piece part has, at a leading end part thereof in a protruding direction, a fifth engagement projecting part that is engageable with the third engagement recessed part and the fourth engagement recessed part;

the third engagement projecting part and the fourth engagement projecting part are disposed on both sides in the radial direction with the third fastening bolt interposed therebetween;

the fifth engagement projecting part is disposed at a right angle with respect to the third engagement projecting part and the fourth engagement projecting part about the axis of the third fastening bolt; and the third clamp piece is configured to be capable of engaging the fifth engagement projecting part with the third engagement recessed part or the fourth engagement recessed part to lock any one of the first valve plate and the second valve plate and disengaging the other one of the valve plates from the third clamp piece by loosening the third fastening bolt and rotating the third clamp piece about an axis of the third fastening bolt in a state where the third engagement projecting part and the fourth engagement projecting part are engaged with the third engagement recessed part and the fourth engagement recessed part.

13. The gate valve according to claim 12, wherein the third fastening bolt has a shaft part that extends in the axial direction, a head part that is provided at a leading end part of the shaft part in the axial direction, and a male thread part that is provided on an outer circumferential surface of the shaft part;

a female thread part with which the male thread part is screwable is provided on an inner surface of the through-hole opened in the third clamp piece;

the shaft part has, at a part thereof on a side closer to the head part than the male thread part, a small-diameter part having an external diameter smaller than an inner diameter of the female thread part;

the small-diameter part is inserted through the through-hole; and an end part of the male thread part on a head part side makes contact with the third clamp piece when the third fastening bolt is loosened.

14. The gate valve according to claim 1, further comprising a valve body in which the first valve plate and the second valve plate are stored, wherein the valve body has side walls that surround the first and second valve plates about the axis and a ceiling wall that is detachably attached to leading-end-side end parts of the side walls in the axial direction; and the first opening and the second opening are opened in the side walls so as to face each other.

* * * * *